United States Patent
Kim et al.

(10) Patent No.: US 11,517,487 B2
(45) Date of Patent: Dec. 6, 2022

(54) ROBOT

(71) Applicant: LG ELECTRONICS INC., Seoul (KR)

(72) Inventors: Boyeon Kim, Seoul (KR); Jinsu Kim, Seoul (KR); Jungkyu Son, Seoul (KR); Hyesun Lee, Seoul (KR); Bina Kim, Seoul (KR); Mina Suh, Seoul (KR); Jinwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 418 days.

(21) Appl. No.: 16/845,579

(22) Filed: Apr. 10, 2020

(65) Prior Publication Data

US 2021/0154064 A1   May 27, 2021

(30) Foreign Application Priority Data

Nov. 27, 2019   (KR) .......................... 10-2019-0154203

(51) Int. Cl.
*A61G 5/04* (2013.01)
*A61G 5/10* (2006.01)
(Continued)

(52) U.S. Cl.
CPC ............. *A61G 5/04* (2013.01); *A61G 5/1056* (2013.01); *A61G 5/1094* (2016.11); *A61G 5/125* (2016.11); *A61G 5/128* (2016.11); *B25J 9/1651* (2013.01); *B25J 9/1664* (2013.01); *B60N 2/39* (2013.01); *B60R 7/08* (2013.01)

(58) Field of Classification Search
CPC ...... A61G 5/04; A61G 5/1056; A61G 5/1094; A61G 5/125; A61G 5/128; A61G 5/06; A61G 2203/42; B25J 9/1651; B25J 9/1664; B25J 9/161; B25J 9/0009; B25J 11/00; B25J 13/06; B60R 7/08; B60N 2/39; B60N 2/245; B60N 2/10; B60N 2/1803; B60N 2/181; B60N 2/1878; B60G 17/0165

See application file for complete search history.

(56) References Cited

U.S. PATENT DOCUMENTS 6,068,280 A * 5/2000 Torres ...................... A61G 5/10
                                                             180/328
6,105,706 A * 8/2000 Cooper .................... B60N 2/24
                                                             297/344.11
(Continued)

FOREIGN PATENT DOCUMENTS

AT            516072 A1 * 2/2016  ............... A61G 5/04
CN          107569336 A  * 1/2018
(Continued)

*Primary Examiner* — Steve Clemmons
(74) *Attorney, Agent, or Firm* — Birch, Stewart, Kolasch & Birch, LLP

(57) ABSTRACT

Provided is a robot. The robot includes a main body provided with a traveling wheel and a traveling motor for rotating the traveling wheel, a seating body including a seat body and disposed above the main body, a seat body actuator for operating the seat body, a plurality of accessories selectively mounted on an accessory mounting portion disposed on at least one of the main body or the seating body, and a processor for controlling the traveling motor and the seat body actuator based on a type of accessory mounted on the accessory mounting portion.

20 Claims, 30 Drawing Sheets

(51) Int. Cl.
  *B60R 7/08* (2006.01)
  *A61G 5/12* (2006.01)
  *B25J 9/16* (2006.01)
  *B60N 2/39* (2006.01)

(56) References Cited

U.S. PATENT DOCUMENTS

| | | | | |
|---|---|---|---|---|
| 6,793,232 | B1 * | 9/2004 | Wing | A61G 7/1067 |
| | | | | 5/604 |
| 7,113,854 | B2 * | 9/2006 | Mansell | A61G 5/04 |
| | | | | 307/9.1 |
| 7,614,699 | B2 * | 11/2009 | Torres | B60N 2/39 |
| | | | | 297/344.14 |
| 9,073,399 | B1 * | 7/2015 | Richter | B60G 17/0165 |
| 9,133,784 | B2 * | 9/2015 | Seaman | F02D 41/08 |
| 10,710,479 | B2 * | 7/2020 | Ketels | B60N 2/502 |
| 10,821,859 | B2 * | 11/2020 | Parker | B60N 2/1878 |
| 10,912,688 | B2 * | 2/2021 | Cooper | A61G 5/1059 |
| 11,307,588 | B2 * | 4/2022 | Ahola | B60R 16/023 |
| 2005/0177288 | A1 * | 8/2005 | Sullivan | B60W 50/02 |
| | | | | 307/10.1 |
| 2017/0028994 | A1 * | 2/2017 | Addison | G05B 19/04 |
| 2017/0227969 | A1 * | 8/2017 | Murray | A01C 21/00 |
| 2018/0164829 | A1 * | 6/2018 | Oshima | G05D 1/0248 |

FOREIGN PATENT DOCUMENTS

| | | | | |
|---|---|---|---|---|
| CN | 107753194 | A | * | 3/2018 |
| JP | 2014004291 | A | * | 1/2014 |
| KR | 20130057648 | A | * | 6/2013 |
| KR | 10-2016-0046676 | A | | 4/2016 |
| NO | 20190030 | A1 | * | 7/2020 |
| WO | WO-2013183398 | A1 | * | 12/2013 ............ F16M 11/10 |

* cited by examiner

ROBOT

CROSS-REFERENCE TO RELATED APPLICATIONS

This application claims the priority benefit under 35 U.S.C 119 to Korean Patent Application No. 10-2019-015420, filed in the Republic of Korea on Nov. 27, 2019, the entire contents of which are incorporated herein by reference.

FIELD OF THE DISCLOSURE

The present invention relates to a robot.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

In recent years, there has been a trend of increasing in number of guidance robots, which provide a variety of guidance services at the airport, government offices, etc., a transport robot for transporting goods, or a boarding robot on which the user boards.

The boarding robot may be configured so that a seating plate on which a user is seated elevatably provided. An example of the robot on which the seating plate is elevatable may be a standing auxiliary wheelchair robot using an X-shaped link, which is disclosed in Korean Patent Publication No. 10-2016-0046676 (Published on Apr. 29, 2016).

The standing auxiliary wheelchair robot disclosed in Korean Patent Publication No. 10-2016-0046676 (Published on Apr. 29, 2016) has an elevating device for elevating the seat plate. The elevator may include a link assembly disposed on both sides of upper left and right sides of a lower frame and having a plurality of links hinge-coupled to be centered in an X shape, an upper frame connected to an upper side of the link assembly and installed at a lower portion of the seating plate, and a link drive body connected to the lower side of the link assembly to expand and contract the link assembly in a vertical direction. A user may manipulate a controller so that a height of the seating plate to fit its own body size to operate the elevating device and may use the elevating device by adjusting the height of the seating plate.

In addition, when the user uses the wheelchair robot as a normal wheelchair device. Then, when the user stands, the user may use the wheelchair robot as a device that assists the standing so that the user to stand by himself by operating an elevating device and a tilting device.

Since the seating plate according to the related art is elevated or tilted by a user's control operation, there is a limitation that it is difficult to actively respond to a user's request or a state of a wheelchair robot.

SUMMARY

Embodiments provide a robot in which a plurality of accessories are capable of being selectively mounted to improve convenience, thereby minimizing safety accidents caused by the accessories.

In an embodiment, a robot includes: a main body provided with a traveling wheel and a traveling motor configured to allow the traveling wheel to rotate; a seating body comprising a seat body and disposed above the main body; a seat body actuator configured to allow the seat body to operate; a plurality of accessories selectively mounted on an accessory mounting portion disposed on at least one of the main body or the seating body; and a processor configured to control the traveling motor and the seat body actuator in a special mode different from a normal mode according to a type of accessory mounted on the accessory mounting portion.

The plurality of accessories may include a cup holder which is separably mounted on the accessory mounting portion.

When the cup holder is mounted on the accessory mounting portion, and the main body travels along a slope, the processor may be configured to allow the seat body actuator to operate so that the seat body is disposed horizontally.

When the cut holder is mounted on the accessory mounting portion, and the main body rotates or passes over a protrusion, the processor may be configured to drive the traveling motor at a lower speed than a speed of the traveling motor in the normal mode.

The plurality of accessories may include a baggage supporter which is separably mounted on the accessory mounting portion and on which a baggage is supported.

When the baggage supporter is mounted on the accessory mounting portion, and the main body rotates, passes over a protrusion, or travels along a slope, the processor may be configured to drive the traveling motor at a lower speed than a speed of the traveling motor in the normal mode.

When the baggage supporter is mounted on the accessory mounting portion, and the main body travels along the slope that is inclined at a set angle or more, the processor may be configured to drive the traveling motor at a minimum speed while the main body travels along the slope that is inclined at the set angle or more.

When the baggage supporter is mounted on the accessory mounting portion, and the baggage is supported on the baggage supporter, the processor may be configured to allow the main body to travel a traveling path having no slope or a minimum number of slopes among a plurality of traveling paths.

The plurality of accessories may include a medical device supporter on which a medical device to assist user's walk is placed, which is separably mounted on the accessory mounting portion.

The robot may further include: a foot supporter disposed on a front lower portion of the main body; and a foot supporter actuator configured to adjust a height or angle of the foot supporter.

When the medical device supporter is mounted on the accessory mounting portion, the processor may control the food supporter actuator to adjust the angle or height of the foot supporter.

The robot may further include: an armrest body disposed on the seat body to move forward and backward; and an armrest body mover configured to allow the armrest body to move forward and backward.

When the medical device supporter is mounted on the accessory mounting portion, the processor may control the armrest body mover in a boarding mode in which the armrest body moves backward.

When the medical device supporter is mounted on the accessory mounting portion, the processor may be configured to allow the main body to travel along a traveling path, of which a minimum height of a ceiling exceeds a set height, among a plurality of selectable traveling paths.

When the medical device supporter is mounted on the accessory mounting portion, and a traveling path, of which a minimum height of a ceiling exceeds a set height, among a plurality of selectable traveling paths is not provided, the processor may stop the main body after allowing the main body to travel in front of a position at which the height of the ceiling is equal to or less than the set height.

The plurality of accessories may include a medicine supporter which is separably mounted on the accessory mounting portion and on which a medicine is supported.

When the medicine supporter is mounted on the accessory mounting portion, the processor may be configured to drive the traveling motor at a lower speed than a speed of the traveling motor in the normal mode while the main body rotates, passes over a protrusion, or travels along a slope.

When the medicine supporter is mounted on the accessory mounting portion, and the main body travels along the slope that is inclined at a set angle or more, the processor may be configured to drive the traveling motor at a minimum speed while the main body travels along the slope that is inclined at the set angle or more.

When the medicine supporter is mounted on the accessory mounting portion, the processor may be configured to allow the main body to travel a traveling path having no slope or a slope or a minimum number of slopes among a plurality of traveling paths.

The seating body may include: left and right armrest bodies spaced apart from each other in a left-right direction; and a steering selectively disposed on the left and right armrest bodies.

The steering may include: a steering housing; and a display and a steering body disposed in the steering housing. A screen angle of the display may rotate toward an upper direction of the seat body.

In a shopping mode, the processor may be configured to drive the traveling motor at a lower speed than a speed of the traveling motor in the normal mode.

In a shopping mode, the processor may control the seat body actuator in an ascending mode so that the seat body ascends to a shopping height.

The details of one or more implementations are set forth in the accompanying drawings and the description below. Other features will be apparent from the description and drawings, and from the claims.

DETAILED DESCRIPTION OF THE EMBODIMENTS

Figure 1:
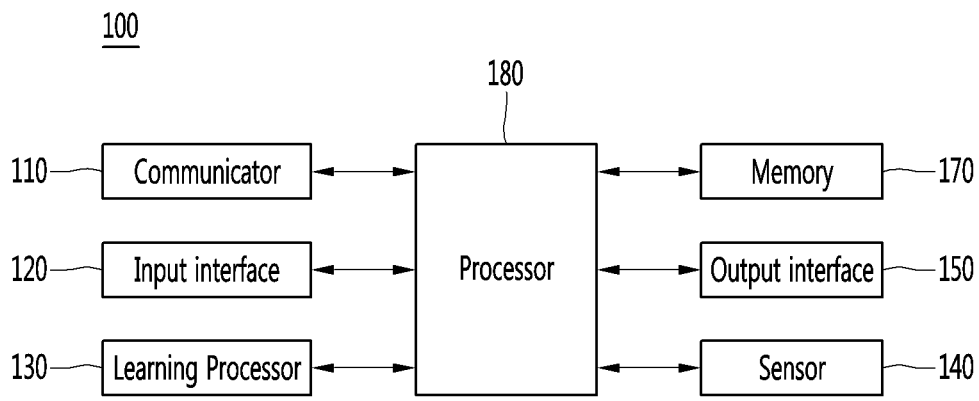
FIG. 1 is a view illustrating an AI device constituting a robot system according to an embodiment.

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input interface 120, a learning processor 130, a sensor 140, an output interface 150, a memory 170, and a processor 180.

The communicator 110 may transmit and receive data to and from external devices such as other AI devices 100a to 100e and the AI server 500 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
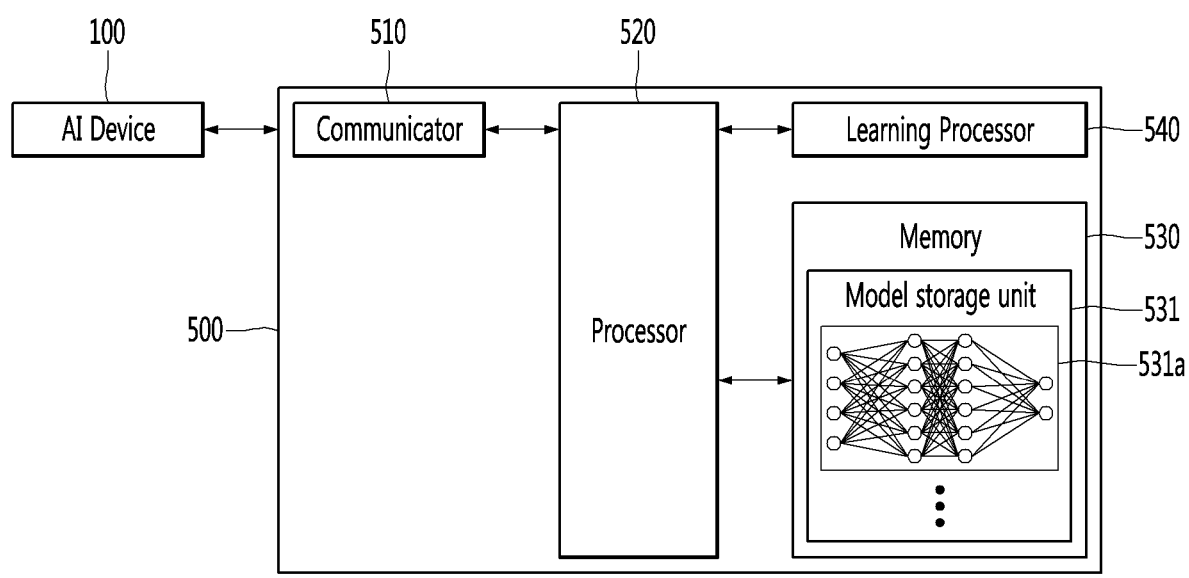
FIG. 2 is a view illustrating an AI server of a robot system according to an embodiment.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communicator 510, a memory 530, a learning processor 540, a processor 520, and the like.

The communicator 510 can transmit and receive data to and from an external device such as the AI device 100.

The memory 530 may include a model storage unit 531. The model storage unit 531 may store a learning or learned model (or an artificial neural network 531a) through the learning processor 540.

The learning processor 540 may learn the artificial neural network 531a by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 530.

The processor 520 may infer the result value for new input data by using the learning model and may generate a response or a control command based on the inferred result value.

Figure 3:
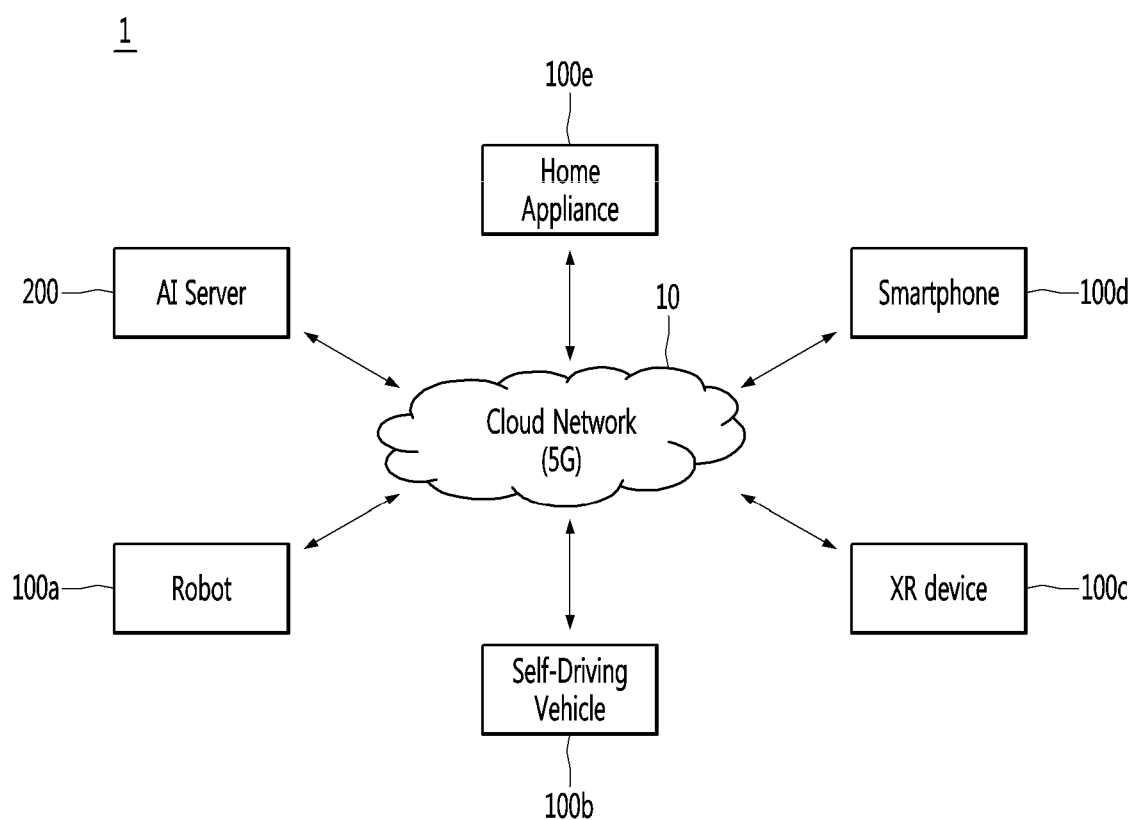
FIG. 3 is a view illustrating an AI system to which a robot system according to an embodiment is applied.

FIG. 3 illustrates an AI system 1 according to an embodiment of the present invention.

Referring to FIG. 3, in the AI system 1, at least one of an AI server 500, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Hereinafter, the robot 100a will be described as an example of the boarding robot on which the user is capable of boarding.

Figure 4:
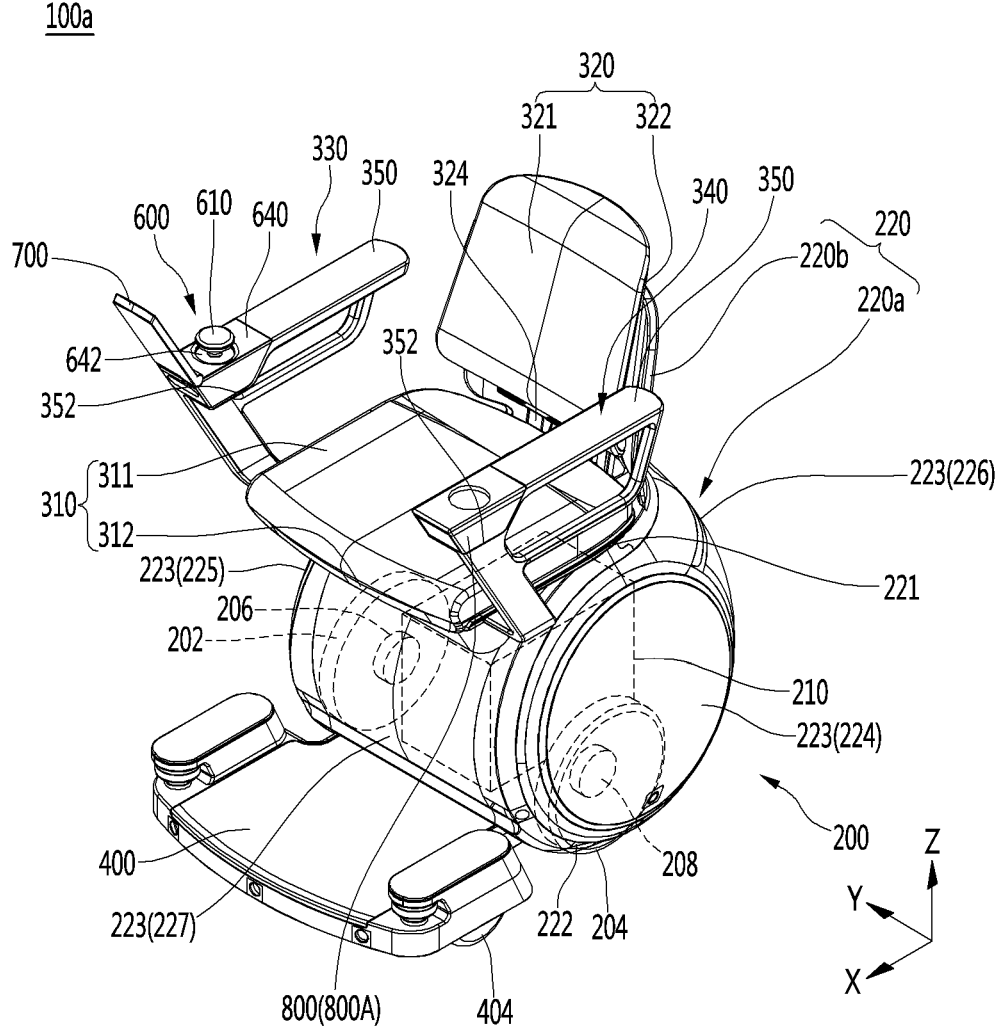
FIG. 4 is a perspective view of a robot according to an embodiment.
Figure 5:
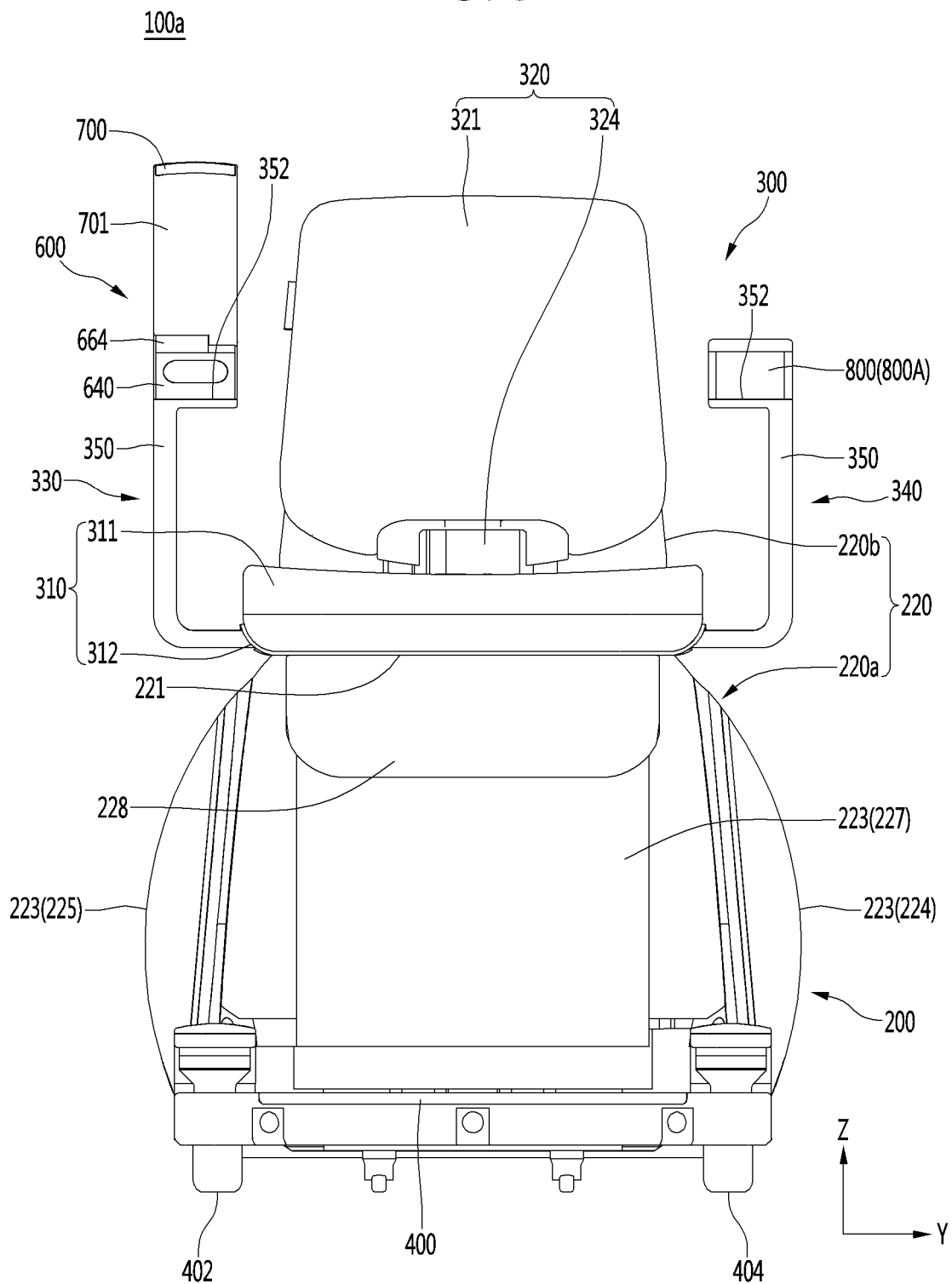
FIG. 5 is a front view of the robot according to an embodiment.
Figure 6:
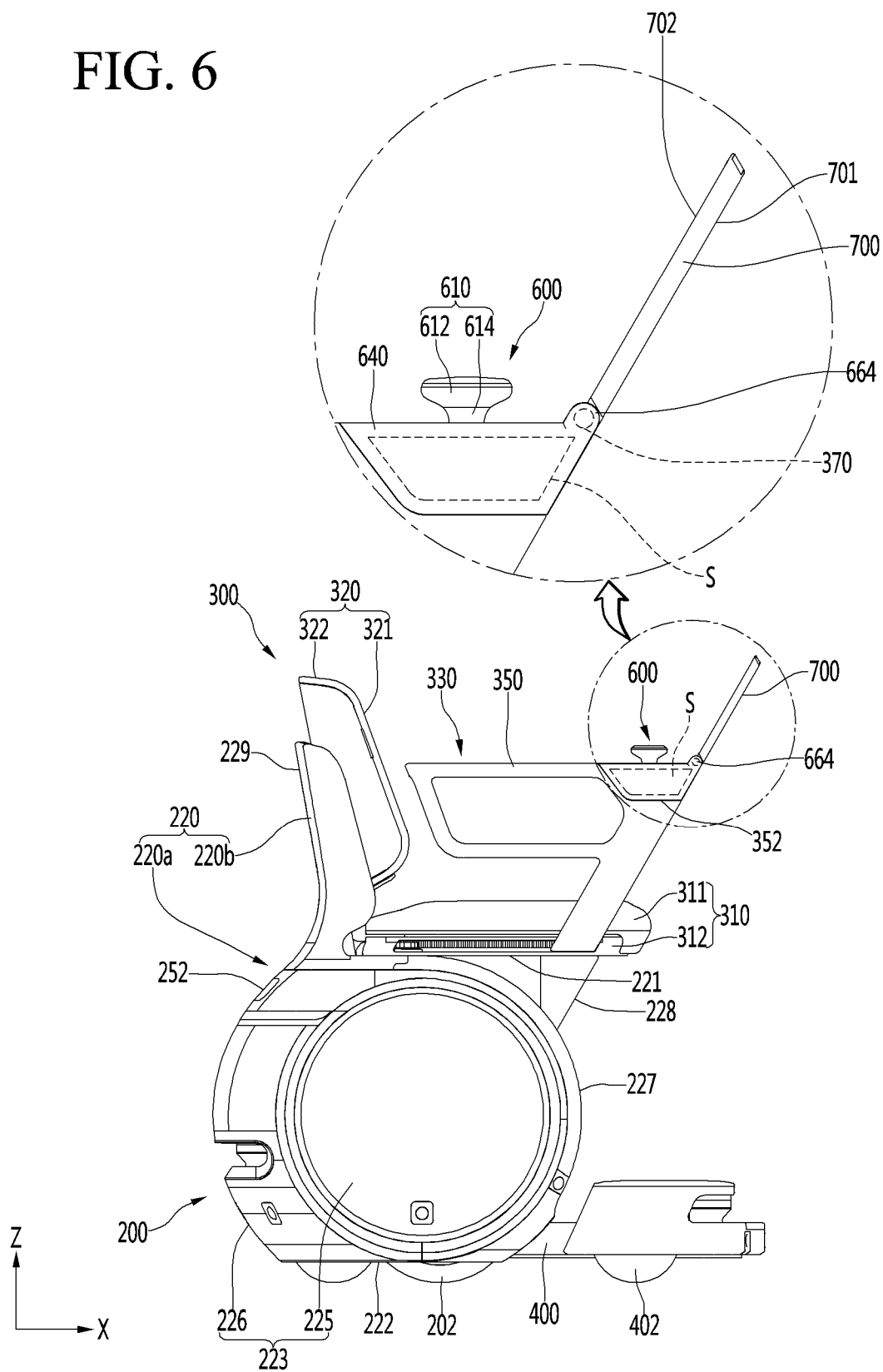
FIG. 6 is a side view of the robot according to an embodiment.

FIG. 4 is a perspective view of the robot according to an embodiment, FIG. 5 is a front view of the robot according to an embodiment, and FIG. 6 is a side view of the robot according to an embodiment.

The robot 100a may include a main body 200.

The main body 200 may include at least one traveling wheel and may be a traveling module or a mobile robot that is capable of traveling according to a user's input or autonomously traveling.

The main body 200 may be an assembly of a plurality of parts, and the main body 200 may further include a driving mechanism (e.g., traveling mechanism) that is connected to the traveling wheel to allow the traveling wheel to rotate forward and backward.

The traveling wheel may be provided in a pair on the main body 200. The pair of traveling wheels 202 and 204 may be provided on the main body 200 so as to be spaced apart from each other in a left-right direction Y.

The driving mechanism may include a traveling motor 206, 208 generating driving force for allowing the traveling wheels 202 and 204 to rotate. In an example of the driving mechanism, the traveling motor may be directly connected to the traveling wheels 202 and 204 so that the traveling wheels 202 and 204 directly rotate forward and backward by the traveling motor 206, 208. In another example of the driving mechanism, the traveling motor may be connected to the traveling wheels 202 and 204 through various power transmission members such as a rotation shaft and gears to allow the traveling wheels 202 and 204 to rotate forward and backward through the power transmission member.

The main body 200 may include a separate steering wheel (not shown) disposed to be spaced apart from the traveling wheels 202 and 204 so as to switch a traveling direction of the robot 100a. The direction of the steering wheel and the traveling direction of the main body 200 may be determined by a steering 600 that will be described below.

The main body 200 may not include the separate steering wheel for switching the traveling direction of the main body 200, and the traveling direction of the main body 200 may be determined using a pair of traveling wheels 202 and 204. The traveling direction of the main body 200 may be determined using the rotation direction of each of the pair of traveling wheels 202 and 204 or a difference in rotation speed of the pair of traveling wheels 202 and 204.

The main body 200 may be configured to allow the pair of traveling wheels 202 and 204 to rotate independently with respect to each other and include a pair of traveling motors 206 and 208 for allowing the pair of traveling wheels 202 and 204 to rotate. The pair of traveling motors 206 and 208 may include a right traveling motor 206 for allowing the right traveling wheel 202 of the pair of traveling wheels 202 and 204 to rotate and a left traveling motor 208 for allowing the left traveling wheel 204 of the pair of traveling wheels 202 and 204 to rotate.

The main body 200 may further include a battery 210 for supplying power to each component of the robot 100a. The battery 210 may be disposed in the main body 200 in consideration of a center of gravity of the entire robot 100a.

The main body 200 may include a housing 220 defining an outer appearance. The housing 220 may be provided as an assembly of a plurality of members. The housing 220 may include a top surface 221, a bottom surface 222, and a circumferential surface 223.

Each of the top surface 221 and the bottom surface 222 of the housing 220 may have a planar shape, and the circumferential surface 223 of the housing 220 may have a curved shape.

The circumferential surface 223 may include a left surface 224, a right surface 225, a rear surface 226, and a front surface 227.

The left surface 224 may be convex toward a left side, and the right surface 225 may be convex toward a right side. And, the rear surface 226 may be convex toward a rear side between an upper end and a lower end. The front surface 227 may be convex forward between the upper and lower ends.

The upper end of the front surface 227 of the circumferential surface 223 may extend closer to a rear end among a front end of the top surface 221 and the rear end of the top surface 221.

The circumferential surface 223 may further include a plane 228 extending from one side of the convex front surface 227 to the front end of the top surface 221. The plane 228 may be an inclined surface that is inclined to face in a front lower direction.

The housing 220 may further include an upper rear surface 229 extending upward from an upper portion of the convex rear surface 226.

The housing 220 includes a lower housing 220a including a top surface 221, a bottom surface 222, and a circumferential surface 223 and an upper housing 220b extending from one side of the lower housing 220a to protrude upward and including an upper rear surface 229.

The lower housing 220a may be provided in a spherical shape of which each of top and bottom surfaces 221 and 222 are flat as a whole.

The upper housing 220b may extend from a rear upper portion of the lower housing 220a to a rear side of a backrest 320 to be described later.

The traveling wheels 202 and 204 may be rotatably disposed in the housing 220, and a lower portion of each of the traveling wheels 202 and 204 may be disposed in the housing 220 to pass through a wheel through-hole defined in a lower portion of the housing 220.

A space may be defined in the housing 220, and the battery 210 may be accommodated in the space defined in the housing 220.

The robot 100a may further include a seating body 300 disposed above the main body 200 and a foot supporter 400 disposed in front of the main body 200.

The seating body 300 may be configured to allow the user to be seated. The seating body 300 may be provided with a seat for allowing the user to be seated thereon. Also, the seating body 300 may be provided with an armrest for allowing a user's arm to be placed. A height of the armrest may be higher than a height of the seat.

The seating body 300 may further include a seat body 310 on which the user sits and a backrest 320 on which the user leans back.

The seat body 310 may include a lower cushion 311 and a lower seat body 312 on which the lower cushion 311 is mounted.

The lower cushion 311 may be disposed on a top surface of the lower seat body 312. The lower cushion 311 may be provided to be more elastic than the lower seat body 312.

The lower seat body 312 may be disposed on an upper portion of the housing 220, in particular, the lower housing 220a. The lower seat body 312 may cover a space defined in the housing 220.

The seat body 310 may not include the lower cushion 311, but may include the lower seat body 312.

The backrest 320 may include a rear cushion 321 and a rear seat body 322 supporting the rear cushion 321. The rear seat body 322 may be supported by a rear supporter 324, and the backrest 320 may further include the rear supporter 324.

The rear cushion 321 may be disposed on a front surface of the rear seat body 322. The rear cushion 321 may be provided to be more elastic than the rear seat body 322.

The rear seat body 322 may entirely or partially overlap the upper housing 220b in a front-rear direction, and the rear supporter 324 may overlap the upper housing 220b in the front-rear direction. The rear seat body 322 and the rear supporter 324 may be protected by the upper housing 220b.

A lower portion of the rear supporter 324 may be connected to the lower seat body 312. The rear supporter 324 may be configured so that an upper part thereof is bent with respect to the lower part thereof. The lower portion of the rear supporter 324 may be rotatably connected to the lower seat body 312 by a hinge shaft, and the backrest 320 may be disposed to rotate about the lower portion.

The backrest 320 may not include the rear cushion 321, but may include the rear seat body 322 and the rear supporter 324.

The armrest may be disposed in the seat body 310 so as to move forward and backward. The armrest may be provided in a pair on the seating body 300.

The pair of armrests 330 and 340 may include a right armrest 330 and a left armrest 340 and the right armrest 330 and the left armrest 340 may be spaced apart from each other in the left-right direction Y and may be arranged symmetrical to each other in the left-right direction Y.

The pair of armrests 330 and 340 may be disposed on the seat body 310, in particular, the lower seat body 312 so as to move forward and backward, and a lower portion of each of the pair of armrests 330 and 340 may be inserted into the lower seat body 312. The lower portion of each of the pair of armrests 330 and 340 may be guided to move forward and backward in a front-rear direction X along a guide provided on the seat body 310.

The foot supporter 400 may be disposed on the main body 200. The foot supporter 400 may be disposed on the main body 200 to protrude in the front-rear direction. The foot supporter 400 may be disposed at a front lower portion of the main body 200. The foot supporter 400 may be disposed on the main body 200 to move forward and backward in the front-rear direction X.

An auxiliary wheel supporting the foot supporter 400 may be disposed on the foot supporter 400. A pair of auxiliary wheels may be provided on the foot supporter 400, and the pair of auxiliary wheels 402 and 404 may be disposed the foot supporter 400 so as to be spaced apart from each other in a horizontal direction.

The robot 100a may include a steering 600 operated by the user. The steering 600 may be an adjusting device such as a jog & shuttle or a joystick.

The steering 600 may include a handle 612 held by the user. The steering 600 may be an input interface that is held and manipulated by the user's hand to input a traveling direction or traveling speed of the robot 100a.

The steering 600 may be disposed on at least one armrest. The steering 600 may be provided on each of the pair of armrests 330 and 340 and may be disposed on one of the pair of armrests 330 and 340.

The steering 600 may include a steering body 610 that is held by the user's hand. The steering body 610 may be a body which is held by the user's hand so as to be manipulated in various directions such as front, rear, left, and right directions. A handle 612 that is held by the user's hand may be disposed on an upper portion of the steering body 610. The steering body 610 may include a steering shaft 614 extending from a lower portion of the handle 612.

The user may hold the handle 612 while sitting on the seat body 310 to push the steering body 610 forward, pull the steering body 610 backward, or push the steering body to a left or right side.

For example, in the steering body 610, the handle 612 is inclined to one side such as the front, rear, left, or right side with respect to the steering shaft 614. The robot 100a may include a sensor sensing an inclination angle and an inclination direction of the steering body 610. The robot 100a may sense a steering direction or speed by the inclination angle (or inclination angle), the inclination direction, etc. of the steering body 610, which are sensed by the sensor.

For another example, in the steering body 610, the steering shaft 614 and the handle 612 may be disposed to move to the front, rear, left, or right side. The robot 100a may include a sensor sensing a position of the steering body 610. The robot 100a may sense the steering direction or speed according to the position of the steering body 610, which is sensed by the sensor.

For another example, in the steering body 610, the steering shaft 614 and the handle 612 may be disposed to rotate in a clockwise or counterclockwise direction. The robot 100a may include a sensor sensing a rotation angle of the steering body 610. The robot 100a may sense the steering direction or speed according to the rotation angle of the steering body 610, which is sensed by the sensor.

The sensor may transmit a signal of the sensed steering direction or speed to a processor 180, and the processor 180 may control the traveling motors 206 and 208 which will be described later according to the signal transmitted from the sensor.

The robot 100a may further include a display 700. The display 700 may be disposed on at least one of the pair of armrests 330 and 340. The display 700 may be disposed to rotate about a horizontal rotation center. The display 700 may be an output interface capable of displaying various information such as traveling information.

The display 700 may be rotatably connected to the steering housing 640. The display 700 may be connected to the front end of the steering housing 640.

The display connection portion 664 to which the display 700 is rotatably connected may be provided in the steering housing 640.

The display connection portion 664 may be spaced apart from the steering body 610 in a horizontal direction when the steering body 610 ascends.

The robot 100a may further include a display rotator 370 that allows the display 700 to rotate. The display rotator 370 may be a rotating mechanism for allowing the display 700 connected to the display 700 to rotate. The display rotator 370 may include a display motor connected to the display 700 to allow the display 700 to rotate. Hereinafter, for convenience, like the display rotator 370, the display motor will be described with reference numeral 370. The display motor 370 may be disposed to be accommodated in the display connection portion 664. A motor space in which the display motor 370 is accommodated may be defined in the display connection portion 664.

The display motor 370 may be provided with a rotation shaft that allows the display 700 to rotate, and the rotation shaft may be disposed horizontally. The rotation shaft may be lengthily disposed in the left-right direction Y. The display motor 370 may allow the display 700 to rotate so that the display 700 is erected about a rotation axis, or the display 700 is laid down.

In this specification, the display 700 is not limited to being vertically erected, but may be defined to include being erected at a predetermined angle.

The display 700 may include a front surface 701 facing a front side and a rear surface 702 facing a rear side with respect to the standing display 700. A screen that is capable of providing a variety of information to the user may be disposed on the rear surface 702 of the display 700. A touch screen may be disposed on the rear surface 702 of the display 700, and the user may input various commands through the touch screen.

The display 700 may rotate side by side with the top surface of the armrest on the armrest. In this case, the front surface 701 when the display 700 is erected may be a top surface of the display 700, and the rear surface 702 when the display 700 is erected may be a bottom surface of the display play 700.

When the display 700 is laid horizontally, the screen of the display 700 is hidden from the outside, and the screen of the display 700 may be protected.

The robot may include a steering housing 640 in which the steering body 610 is disposed. Also, the steering body 610, the steering housing 640, and the display 700 may constitute the steering 600.

An opening 642 through which the steering body 610 passes may be defined in an upper portion of the steering housing 640.

An inner space S (see FIG. 6) into which the steering body 610 is accommodated to be elevatable may be defined inside the steering housing 640. The steering, in particular, the steering housing 640 may be mounted to be accommodated in an accessory mounting portion provided in the left armrest 340 or the right armrest 330.

Figure 7:
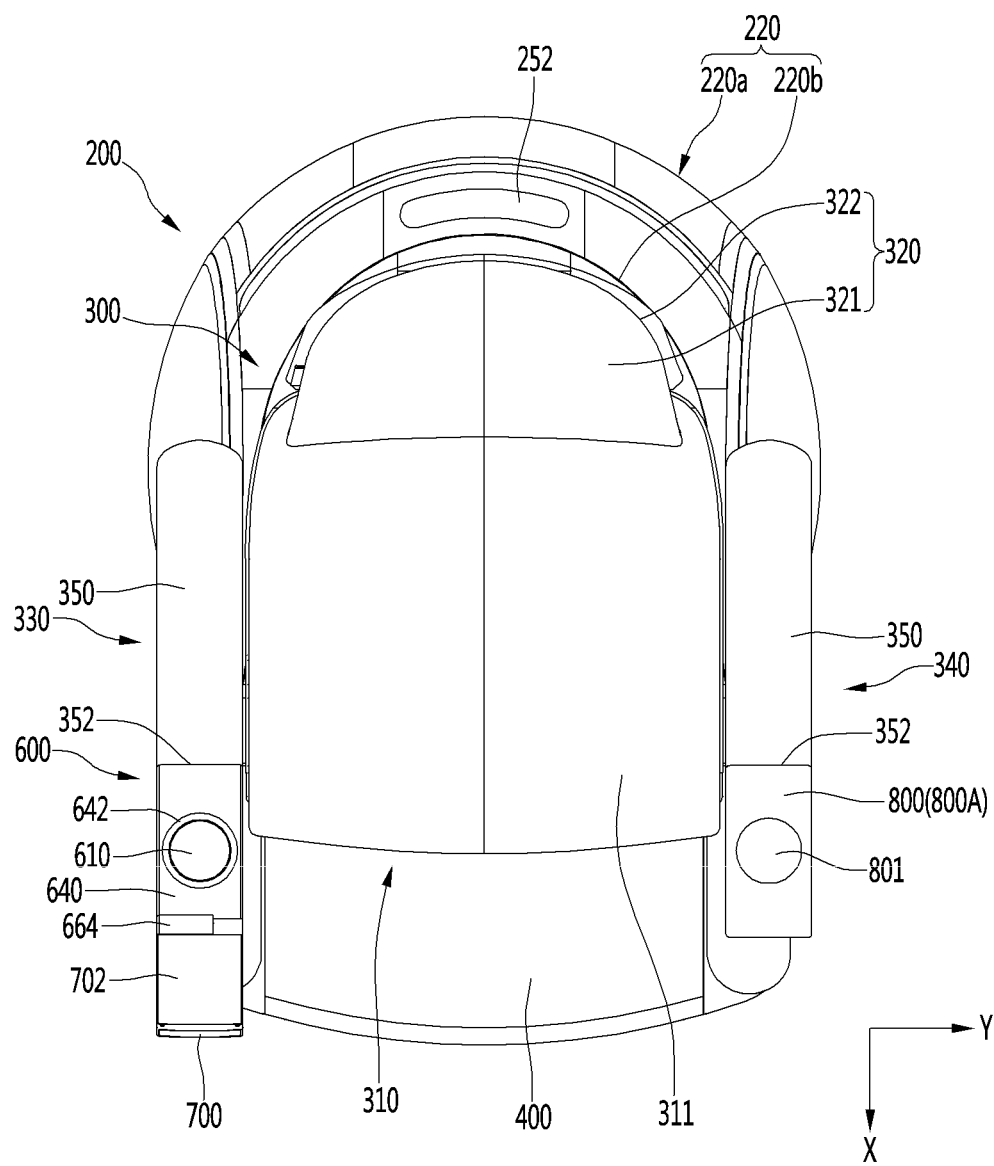
FIG. 7 is a plan view when a cup holder is disposed on the robot according to an embodiment.
Figure 8:
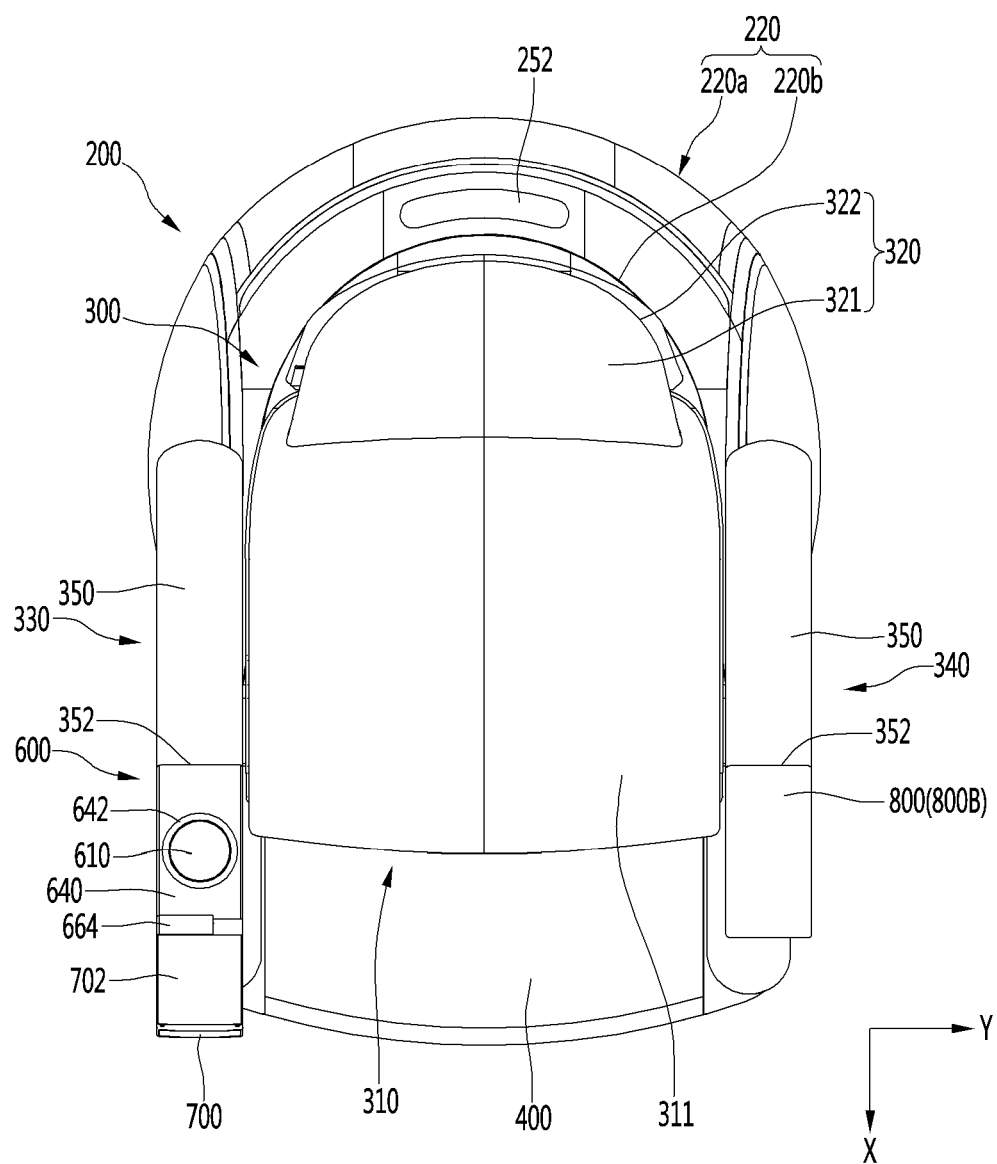
FIG. 8 is a plan view when a sub armrest instead of the cup holder of FIG. 7 is disposed on the robot.
Figure 9:
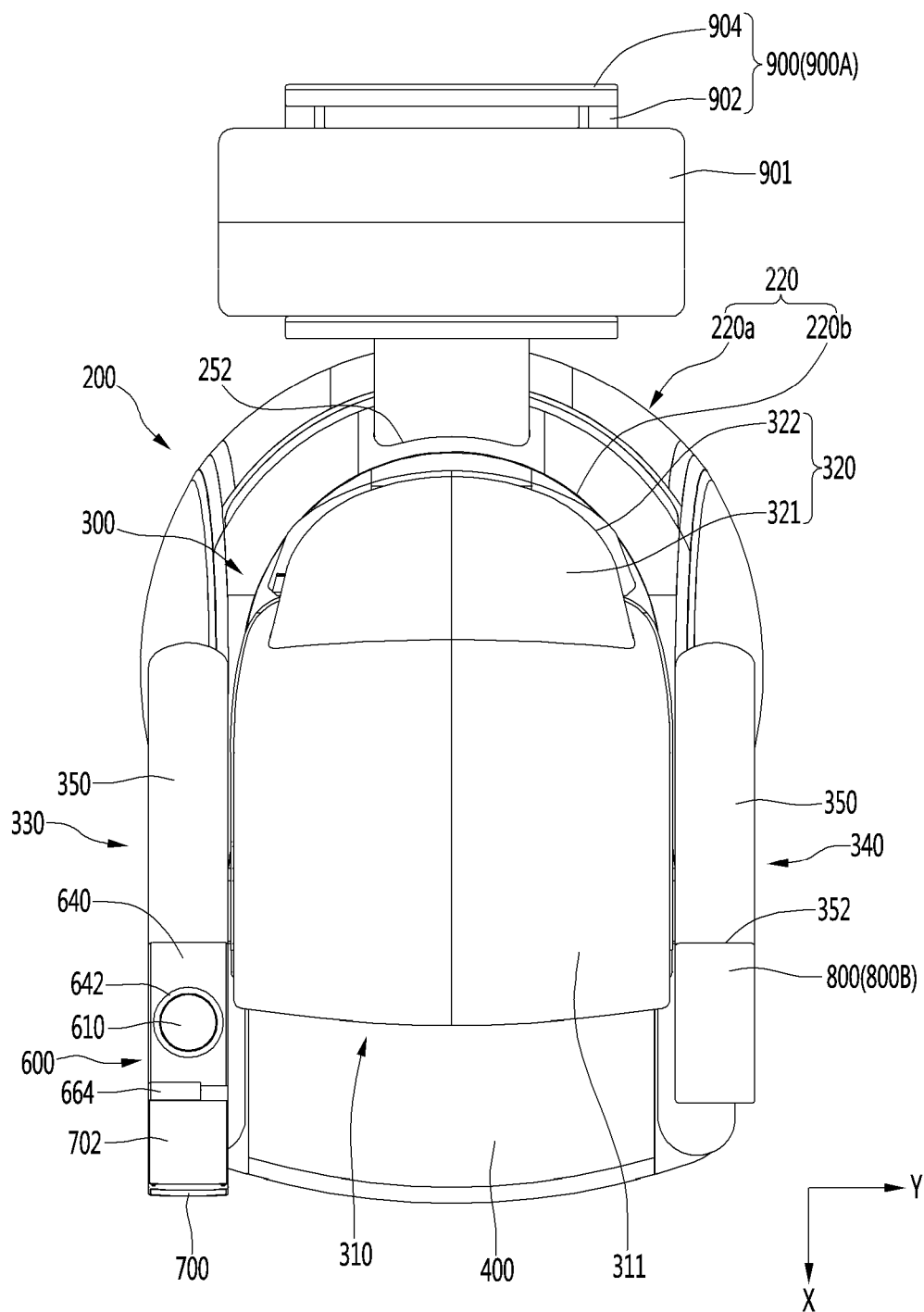
FIG. 9 is a plan view when a baggage supporter is disposed on the robot according to an embodiment.
Figure 10:
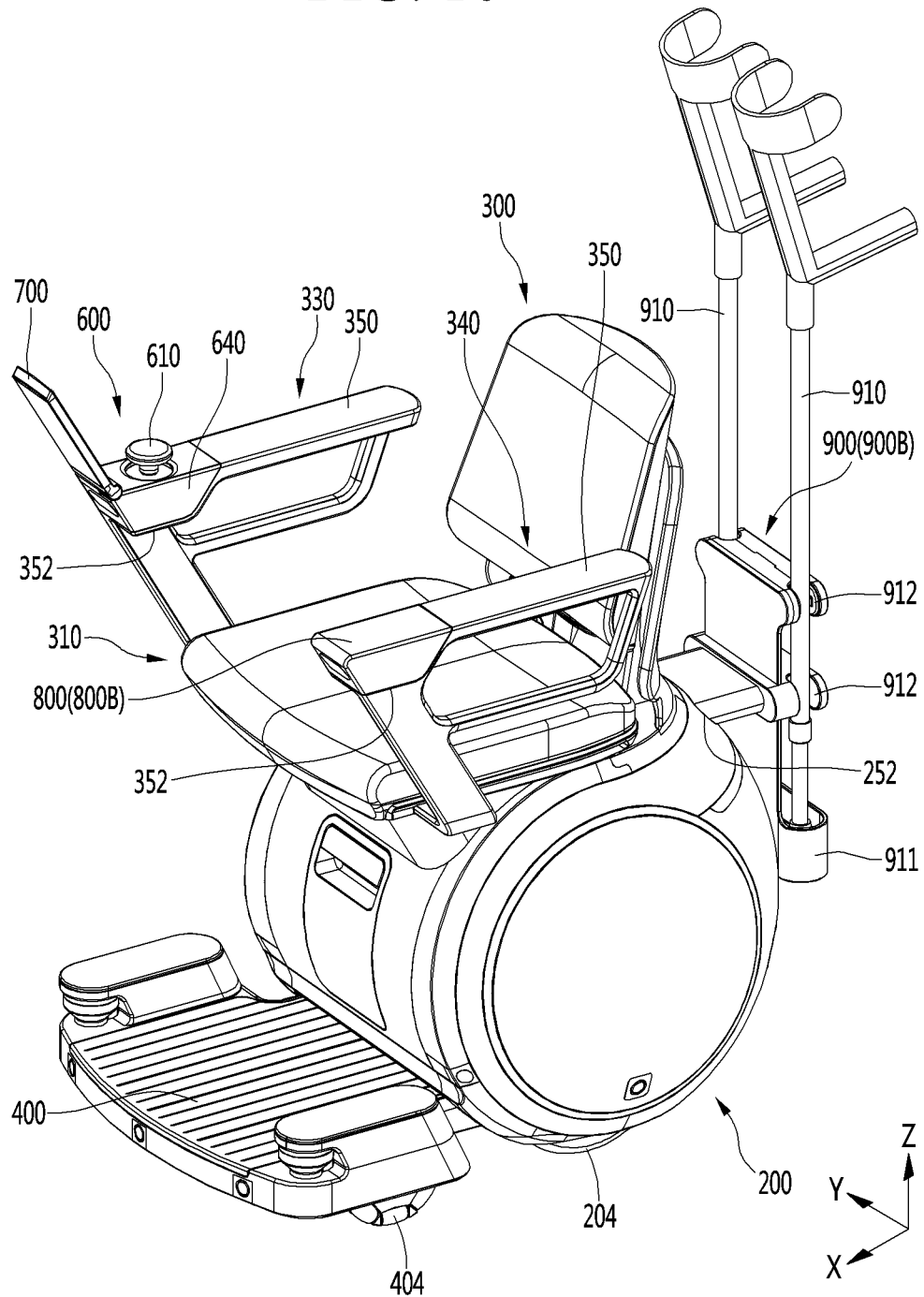
FIG. 10 is a perspective view when a medical device supporter is disposed on the robot according to an embodiment.

FIG. 7 is a plan view when a cup holder is disposed on the robot according to an embodiment, and FIG. 8 is a plan view when a sub armrest instead of the cup holder of FIG. 7 is disposed. FIG. 9 is a plan view when a baggage supporter is disposed on the robot according to an embodiment, and FIG. 10 is a perspective view when a medical device supporter is disposed on the robot according to an embodiment.

The robot 100*a* may further include at least one accessory that provides convenience to the user.

A plurality of accessories may be separably mounted on the robot 100*a*.

The accessory may be provided on the armrest or the main body 200, and a plurality of accessories may be provided on the robot 100*a*.

As illustrated in FIGS. 7 and 8, the robot 100*a* may include an accessory 800 (armrest accessory) provided on the armrest.

One example of the accessory 800 provided on the armrest may be a cup holder 800A (see FIG. 7) in which a cup is seated. The cup holder 800A may be an accessory disposed on the armrest body 350 among the plurality of accessories, and a cup accommodation portion 801 may be provided in the cup holder 800A.

Another example of the accessory 800 provided in the armrest may be a sub armrest 800B (see FIG. 8) having the same size and shape as the cup holder 800A but without the cup accommodation portion 801 defined in an upper portion thereof. The sub armrest 800B may be an accessory disposed on the armrest body 350 among the plurality of accessories.

The accessory 800 provided on the armrest is not limited to the cup holder 800A or the sub armrest 800B and thus is not limited to its kind as long as the accessory is capable of providing user's convenience.

At least one accessory mounting portion 352 to which the accessory 800 is mounted may be disposed on the seating body 300, in particular, the armrest.

The accessory mounting portion 352 may be disposed on each of the armrest body 350 of the right armrest 330 and the armrest body 350 of the left armrest 340.

The steering 600 may be selectively disposed on the armrest body 350 (left armrest body) of the left armrest 340 or the armrest body 350 (right armrest body) of the right armrest 330 for the user's convenience.

When the steering wheel 600 and the armrest accessory 800 are disposed together on the robot, the armrest accessory 800 such as the cup holder 800A or the sub armrest 800B may be disposed on the armrest body 350 of the armrest, on which the steering housing 640 is not disposed, among the left armrest 340 and the right armrest 330. In a state of being spaced apart from the steering 600, the armrest accessory 800 may support the user's arm together with the armrest body 350.

For example, when the steering housing 640 is disposed on the accessory mounting portion 352 provided on the armrest body 350 of the right armrest 330, one of the plurality of accessories 800A and 800B may be selectively disposed on the accessory mounting portion 352 disposed on the armrest body 350 of the left armrest 340, for example, the cup holder 80A or the sub armrest 800B may be disposed.

On the other hand, when the steering housing 640 is disposed on the accessory mounting portion 352 provided on the armrest body 350 of the left armrest 340, one of the plurality of accessories 800A and 800B may be selectively disposed on the accessory mounting portion 352 disposed on the armrest body 350 of the right armrest 330, for example, the cup holder 80A or the sub armrest 800B may be disposed.

As illustrated in FIGS. 9 and 10, the robot 100*a* may further include an accessory 900 provided on the main body 200. The robot 100*a* may include both the accessory 800 provided on the armrest and the accessory 900 provided on the main body 200.

The accessory mounting portion 252 (see FIGS. 6, 7, 9, and 10) on which a main body accessory 900 is disposed may be disposed on the main body 200. A portion of the main body accessory 900 may be inserted into the accessory mounting portion 252 disposed on the main body 200, and the main body accessory 900 may be mounted on the main body 200.

The accessory mounting portion 252 disposed on the main body 200 may be disposed at a rear side of the main body 200.

Referring to FIG. 9, an example of an accessory 900 disposed on the main body 200 may be a baggage supporter 900A on which a baggage 901 (e.g., a carrier) is supported, and the baggage supporter 900A may be separably mounted to the accessory mounting portion 252 of the main body 200.

The baggage supporter 900A may include a lower supporter 902 on which a bottom surface of the baggage 901 is placed, and an upper supporter 904 on which the baggage 901 is supported.

The lower supporter 902 may include a pair of lower bodies spaced apart from each other in the left-right direction Y.

The upper supporter 904 may include a rear upper supporter connecting rear portions of the pair of lower bodies to each other and a front upper supporter connecting front portions of the pair of lower bodies to each other.

Referring to FIG. 10, another example of the accessory 900 disposed on the main body 200 may be a medical device supporter 900B on which a medical device 910 for assisting user's walk is mounted. The medical device supporter 900B may be separably mounted to the accessory mounting portion 252 of the main body 200.

For example, the medical device 910 supported on the medical device supporter 920 may be a crutch that is used under the user's armpit, worn on the arm, or grasped by the hand, or a medical aid such as a walking aid to assist a person with a traffic weak.

A medical device mounter 911 on which a lower end of the medical device 910 is placed may be disposed on the medical device supporter 900B.

At least one medical device accommodation groove 912 in which the medical device 910 is accommodated may be defined in the medical device supporter 900B. The whole or a portion of the medical device 910 may be inserted and accommodated in the medical device accommodation groove 912, and the medical device 910 accommodated in the medical device accommodation groove 912 may be seated and supported by the medical device supporter 900B.

The accessory 900 provided on the main body 200 is not limited to the baggage supporter 900A or the medical device supporter 900B, and if the user's article is supported, it may not be limited to the kind thereof.

The robot 100a may further include a locker that locks/unlocks the accessories 800 and 900 to the robot 100a. The locker may limit any separation of the accessories 800 and 900 by hooking the accessories 800 and 900 mounted to the robot 100a. The locker may include a driving source such as a motor or a solenoid valve and a locking member operated by the driving source, and the accessories 800 and 900 may be locked/unlocked by the locking member.

Figure 11:
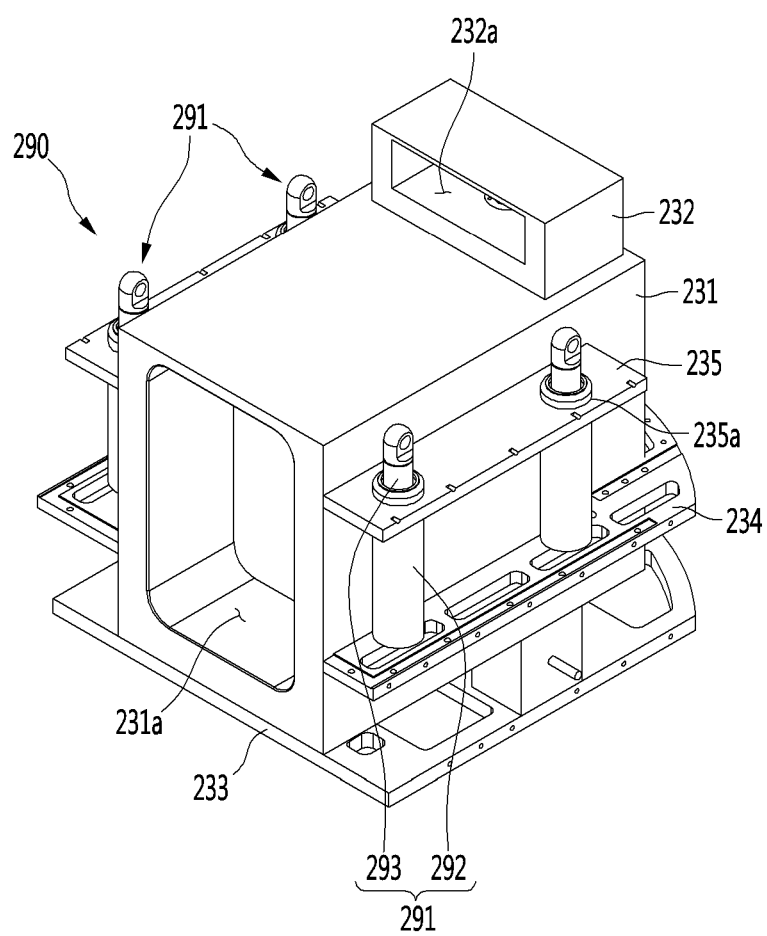
FIG. 11 is a perspective view of a seat body actuator that operates a seat body according to an embodiment.
Figure 12:
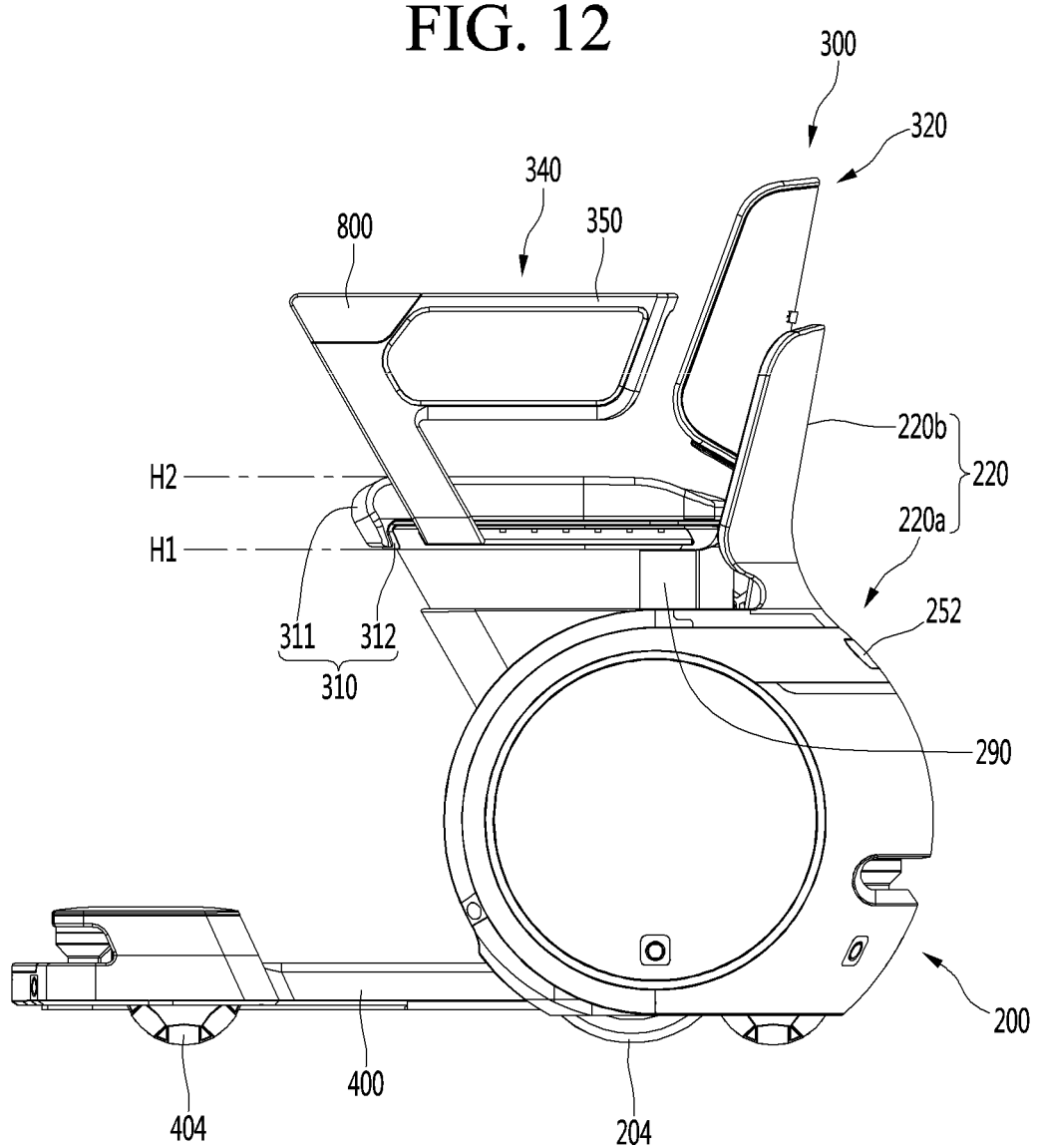
FIG. 12 is a side view when the seat body ascends according to the present invention.
Figure 13:
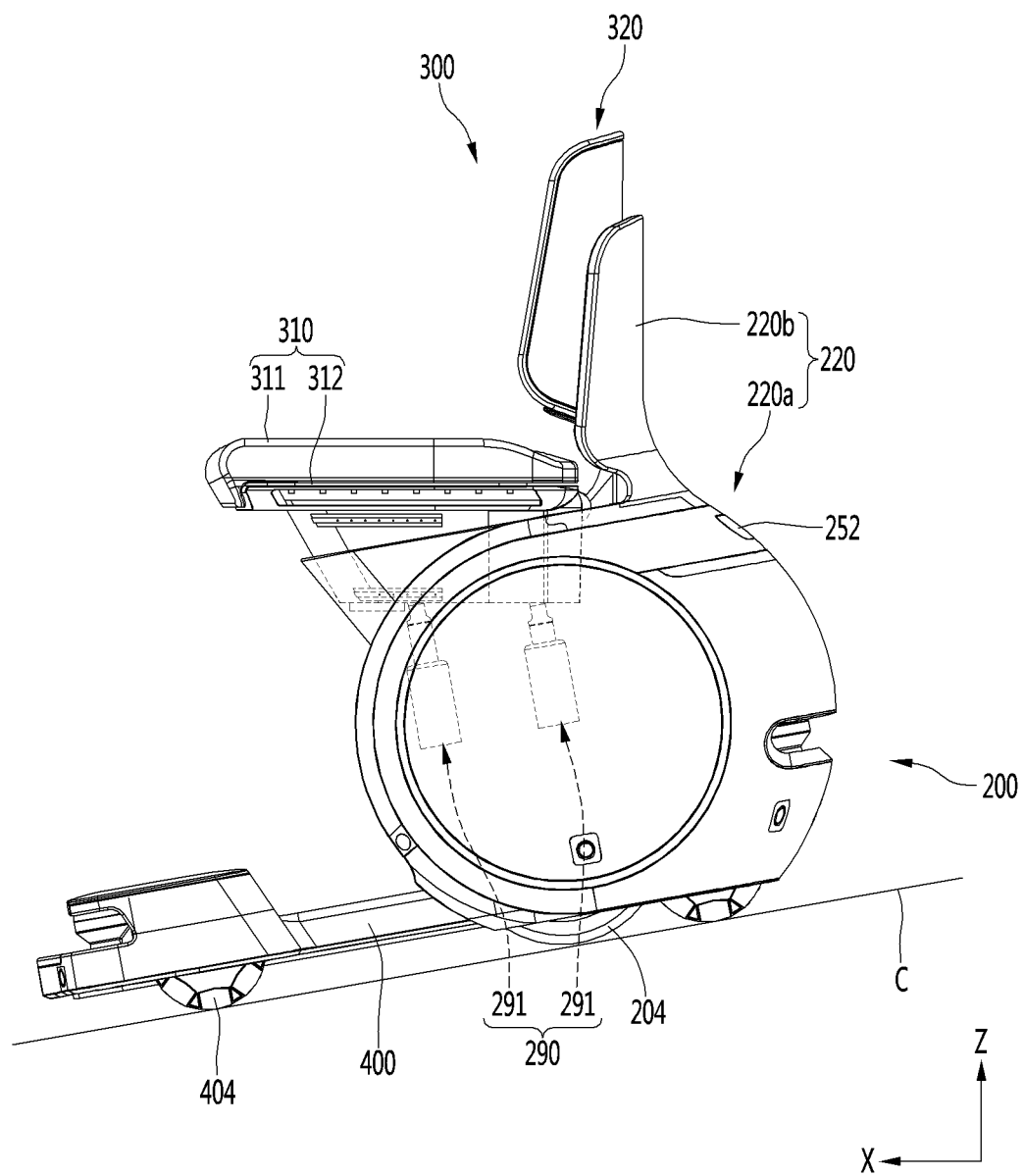
FIG. 13 is a side view when a front portion of the seat body of FIG. 12 ascends.
Figure 14:
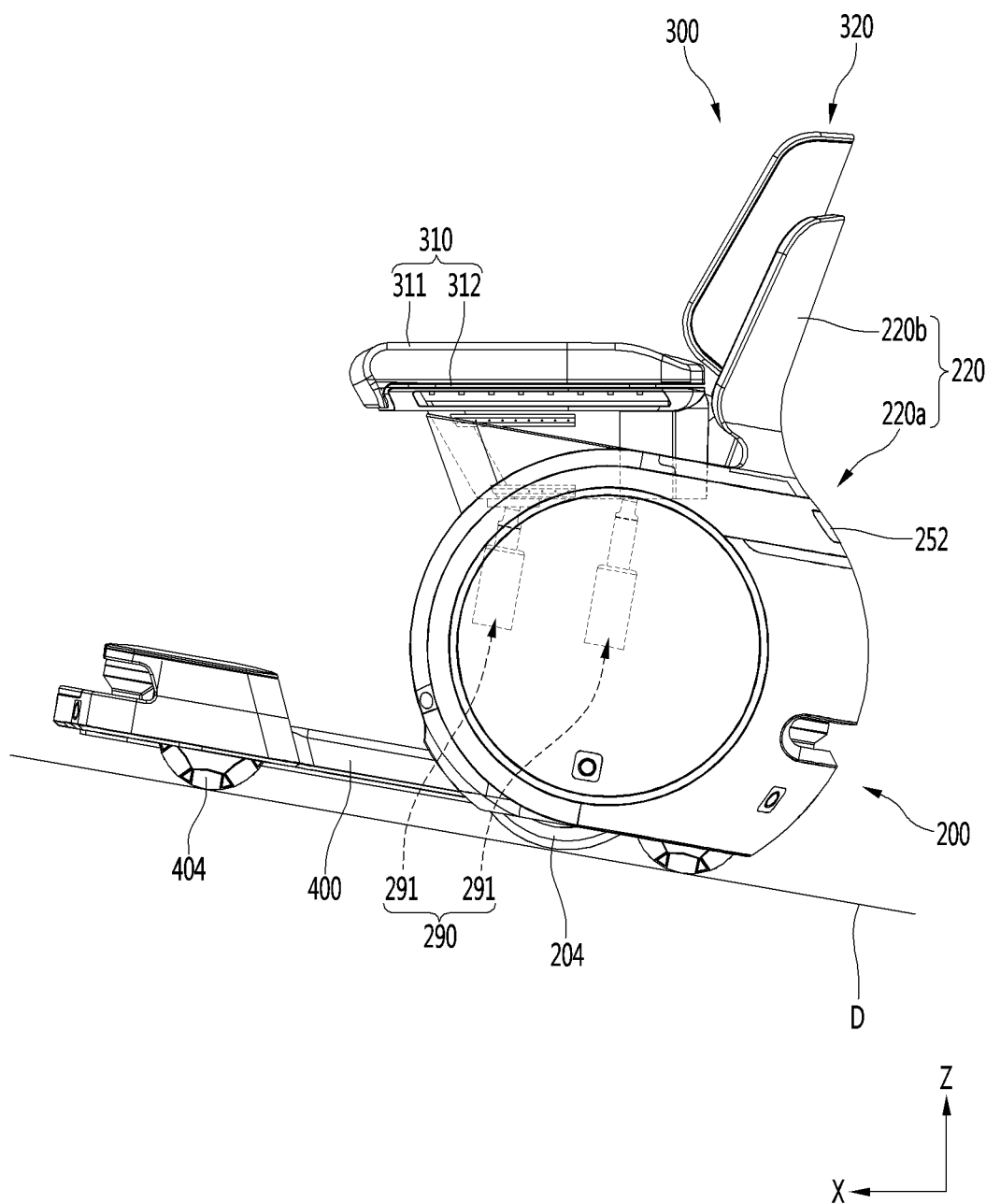
FIG. 14 is a side view when a rear portion of the seat body of FIG. 12 ascends.

FIG. 11 is a perspective view of a seat body actuator that operates a seat body according to an embodiment, FIG. 12 is a side view when the seat body ascends according to the prevention invention, FIG. 13 is a side view when a front portion of the seat body of FIG. 12 ascends, and FIG. 14 is a side view when a rear portion of the seat body of FIG. 12 ascends.

The robot may include a seat body actuator 290 for actuating the seat body 310. The seat body actuator 290 may be disposed on the main body 200 to elevate or tilt the seat body 310.

The seat body actuator 290 may be disposed under the seat body 310.

The seat body actuator 290 may be an elevation mechanism that is capable of adjusting a height of the seat body 310.

The seat body 310 may be elevated between a first height H1 at which a top surface of the main body 200 is covered and a second height H2 higher than the first height H1.

The first height H1 may be a lower limit height of which a height of the seat body 310 is the lowest. The second height H2 may be an upper limit height of which a height of the seat body 310 is the highest.

When the user does not board, a seating body 300 may descend to the first height H1. Thus, the robot 100a may be compacted vertically.

When the user boards, the user may adjust the height of the seat body 310 according to his or her body shape if necessary. Also, the user may adjust the height of the seat body 310 to perform business at the desk or table without waking up from the robot 100a. For example, the user may manipulate a touch screen of the display 700 to adjust the height of the seat body 310.

As illustrated in FIGS. 13 and 14, the seat body actuator 290 may adjust an angle of the seat body 310 so that the seat body 310 is tilted with respect to the main body 200.

When the robot passes over the slopes C and D, the seat body actuator 290 may act as a balancing mechanism to operate the seat body 310 approximately horizontally in the front-rear direction X.

The seat body actuator 290 may be configured to elevate the seat body 310 as well as to tilt the seat body 310.

The seat body actuator 290 may include a plurality of actuators 291 spaced forward and backward from each other. The plurality of actuators 291 may be driven independently of each other to horizontally maintain the seat body 310 (in a normal mode) or tilt the seat body 310 (in a tilting mode).

When the plurality of actuators 291 elevates the seat body 310 to the same height, the seat body 310 may be elevated without being tilted with respect to the main body 200. When the plurality of actuators 291 elevate the seat body 310 to different heights, the seat body 310 may be tilted with respect to the body 200.

As illustrated in FIG. 13, when the robot 100a travels downhill C, the front actuator may adjust a front portion of the seat body 310 to a relatively high height, and the rear actuator may adjust a rear portion of the seat body 310 to a relatively low height.

On the other hand, as illustrated in FIG. 14, when the robot 100 travels uphill D, the front actuator may adjust the front portion of the seat body 310 to a relatively low height, and the rear actuator may adjust the rear portion of the seat body 310 to a relatively high height.

The front actuator may mean an actuator disposed relatively forward among the plurality of actuators 291 provided in the seat body actuator 290, and the rear actuator may mean an actuator disposed relatively backward among the plurality of actuators 291 provided in the seat body actuator 290.

The body 200 may further include an inner body disposed in the housing 220, and the seat body actuator 290 may be disposed on the inner body.

The inner body may include a battery mounting body 231 on which the battery 210 is mounted. The battery mounting body 231 may have a battery accommodating space 231a in which the battery 210 is accommodated.

The inner body may further include an accessory insertion body 232 into which a portion of the accessory 900 separably mounted to the main body 200 is inserted. The accessory insertion body 232 may be disposed above the battery mounting body 231. The accessory insertion body 232 may be disposed at a rear end of a top surface of the battery mounting body 231. The accessory insertion body 232 may have an accessory insertion space 232a into which a portion of the accessory 900 is inserted. A portion of the accessory 900 may be inserted into the accessory insertion space 232a to be supported by the accessory insertion body 232, and the accessory 900 may be mounted to the main body 200.

The inner body may further include a base plate 233 that supports the battery mounting body 231 from below. The base plate 233 may be disposed horizontally on the main body 200. The base plate 233 may define a bottom surface of the inner body.

The inner body may further include a support plate 234 for supporting the actuator 291 and a fixing plate 235 for fixing the actuator 291.

The support plate 234 and the fixed plate 235 may be disposed horizontally on a circumferential surface of the battery mounting body 231. The support plate 234 and the fixed plate 235 may be horizontally disposed on both side surfaces of the battery mounting body 231.

The fixing plate 235 may be disposed above the support plate 234. The support plate 234 and the fixing plate 235 may be spaced apart from each other in the vertical direction.

The support plate 234 may support a cylinder 292 of the actuator 291 from below. The cylinder 292 may be provided with an elevation rod 293 which is elevated by the cylinder 292. An upper end of the elevation rod 293 may contact the bottom surface of the seat body 310.

The fixing plate 235 may fix the cylinder 292 of the actuator 291. The fixing plate 235 may have a through-hole 235a through which the cylinder 292 passes. An inner circumference of the through-hole 235a may contact an outer circumference of the cylinder 292, and the cylinder 292 may be fixed so as not to be shaken with respect to the horizontal direction.

The inner body may further include a base plate 233 that supports the battery mounting body 231 from below. The base plate 233 may be disposed horizontally. The base plate 233 may define a bottom surface of the inner body.

Figure 15:
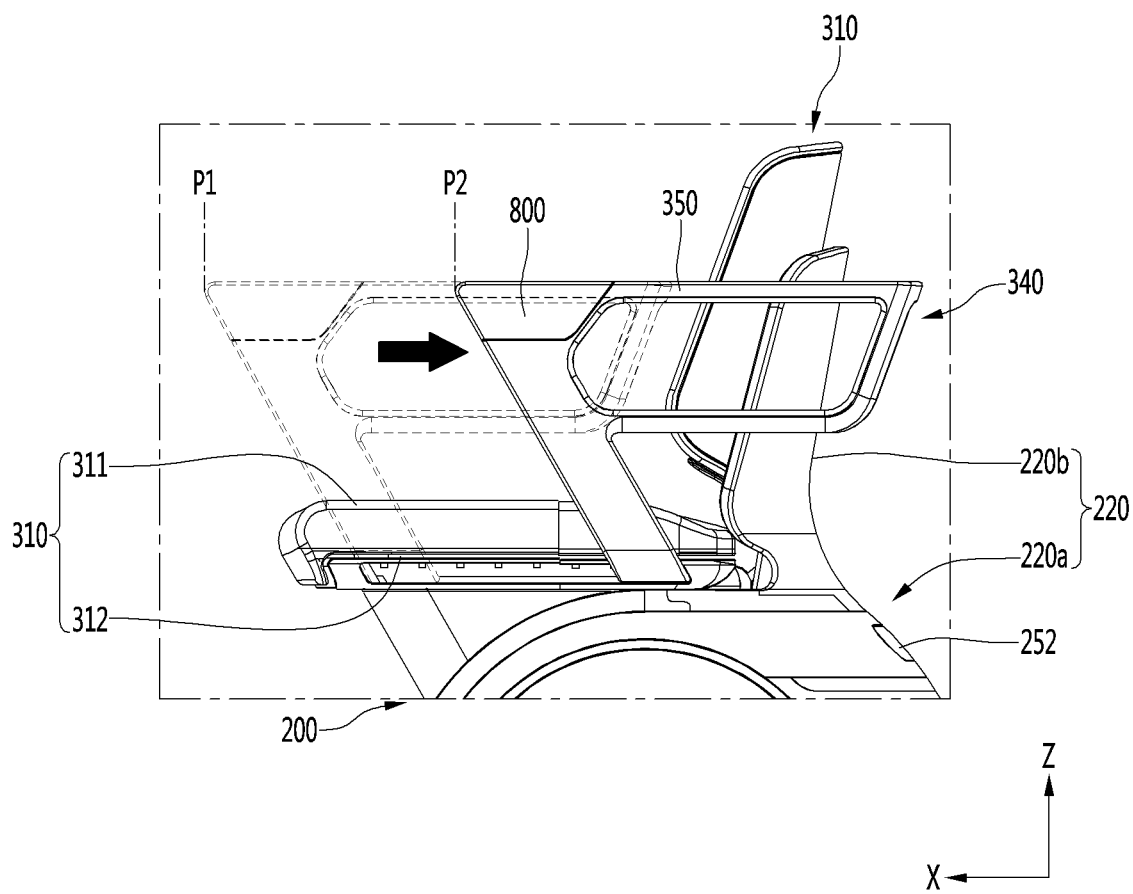
FIG. 15 is a view illustrating a state in which an armrest moves forward and backward according to an embodiment.

FIG. 15 is a view illustrating a state in which the armrest moves forward and backward according to an embodiment.

The armrest may be disposed so that the armrest body 350 moves relative to the seat body 310. The armrest body 350 may be slid in the front-rear direction X with respect to the seat body 310.

The armrest mover for moving the armrest body 350 in the front-rear direction may be disposed on the seat body 310. The armrest mover may be disposed on the lower seat body 312 and connected to a lower portion of the armrest body 350.

The armrest mover may include a motor, a pinion connected to the motor, a rack engaged with the pinion and may further include a coupling body coupled to the armrest body 350. If the armrest mover moves the armrest body 350 linearly, the armrest mover is not limited to the kind, such as a linear motor.

The armrest mover may be provided for each of the right armrest 330 and the left armrest 340, and the right armrest 330 and the left armrest 340 may move independently of each other.

When the robot includes both the right armrest 330 and the left armrest 340, the robot may include a right armrest mover connected to the armrest body 350 of the right armrest 330 to allow the right armrest 330 to move forward and backward and a left armrest mover connected to the armrest body 350 of the left armrest 340 to allow the left armrest 340 to move forward and backward.

The armrest body 350 may move between a first position P1 and a second position P2 disposed behind the first position P1 by the armrest mover.

The first position P1 may be defined as an advanced position at which the armrest body 350 moves forward by the armrest mover, and the second position P2 is defined as a retreat position at which the armrest body 350 moves backward by the armrest mover.

The armrest body 350 of the right armrest 330 and the armrest body 350 of the left armrest 340 may move away from each other as they move backward. In more detail, a distance between the pair of armrests when the pair of armrest bodies 350 are disposed at the second position P2 may be greater than a distance between the pair of armrest when the pair of armrest bodies 350 are disposed at the first position P1.

The robot may allow at least one of the pair of armrest bodies 350 to move to the second position P2, and the user may be comfortably seated on the seat body 310 without being disturbed by the armrest body 350 just before the user boards.

After the user boards, the robot may allow the armrest body 350 to move forward or backward.

Figure 16:
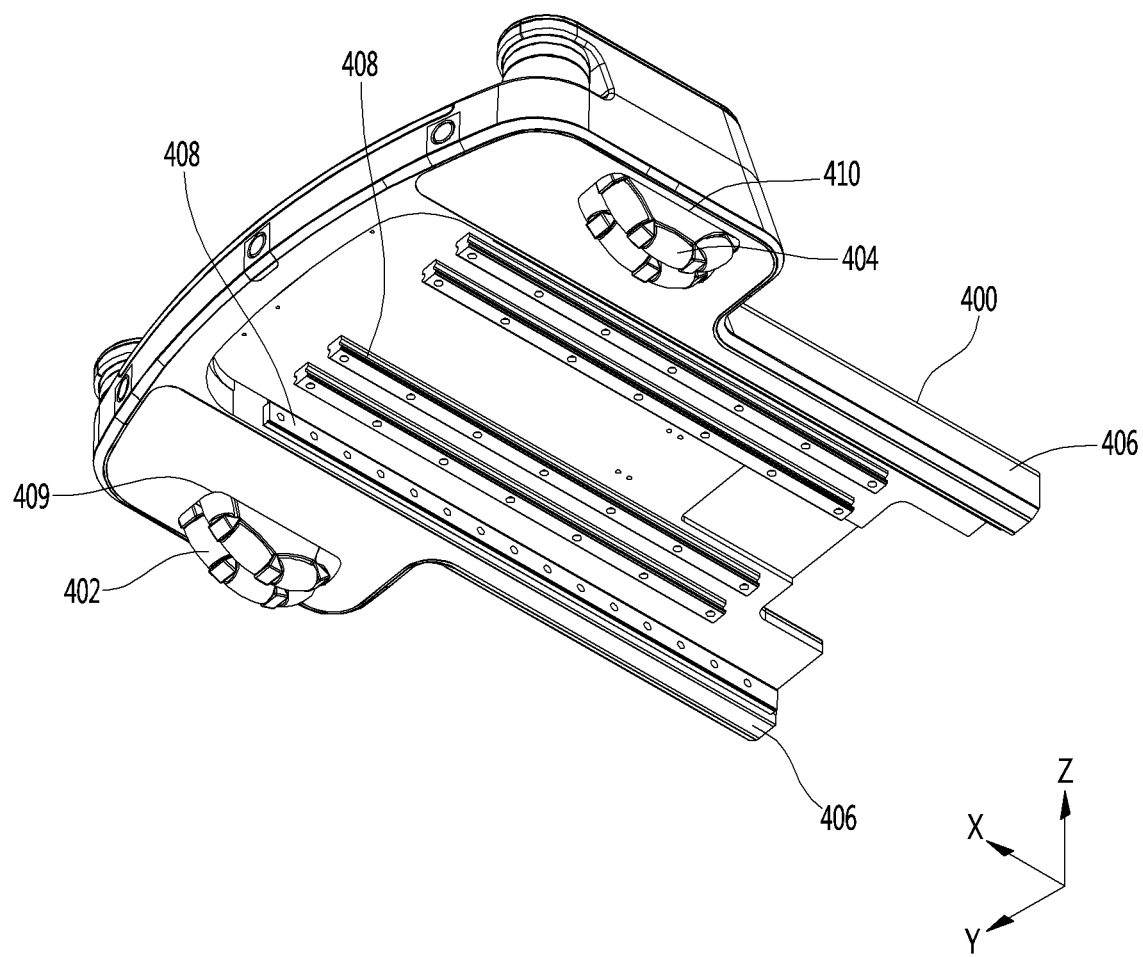
FIG. 16 is a view of a foot supporter according to an embodiment.
Figure 17:
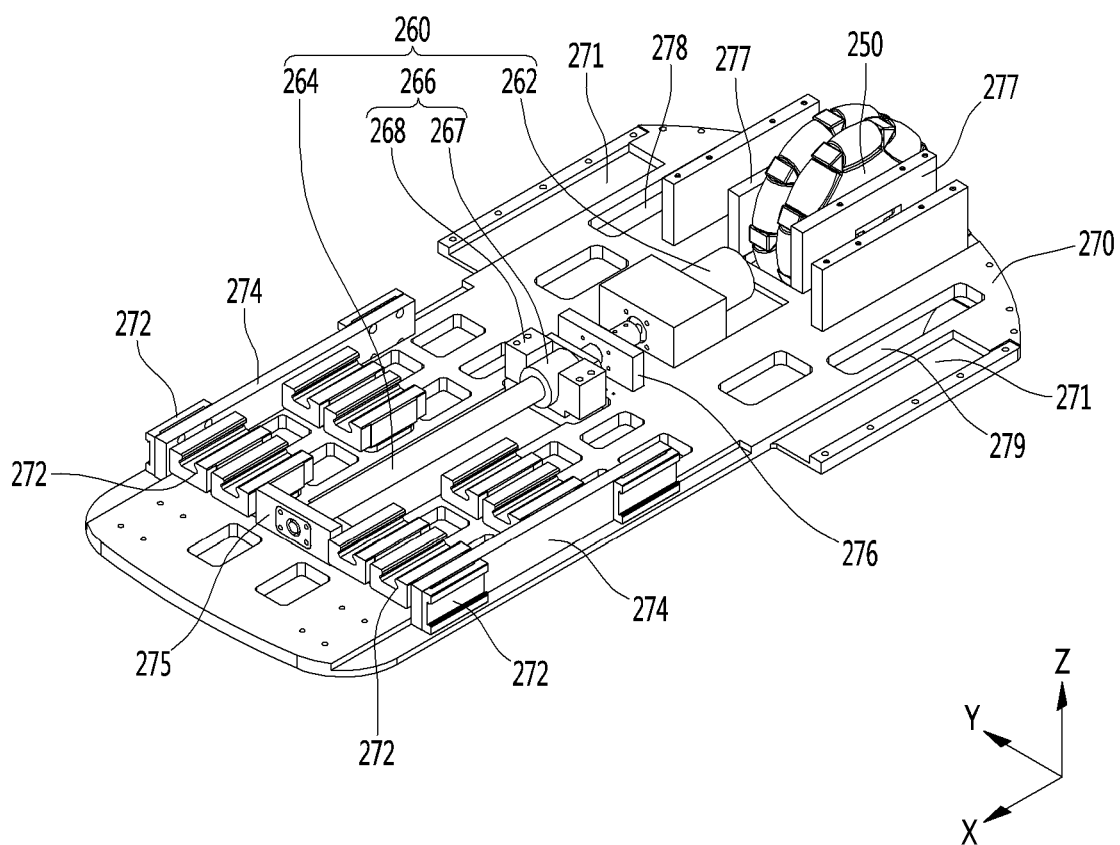
FIG. 17 is a view of a foot supporter mover according to an embodiment.

FIG. 16 is a view of the foot supporter according to an embodiment, and FIG. 17 is a view of a foot supporter mover according to an embodiment.

The robot may further include a foot supporter mover 260 for allowing the foot supporter 400 to move forward or backward.

The foot supporter mover 260 may be connected to the foot supporter 400 and may allow the foot supporter 400 to move in the front-rear direction X.

The foot supporter mover 260 may include a motor 262 and at least one power transmission member for transmitting driving force of the motor 262 to the foot supporter 400. The power transmission member constituting the foot supporter mover 260 may include a screw 264 rotating by the motor 262 and a carrier 266 disposed to move along the screw 264 and connected to the foot supporter 400.

The motor 262 may be mounted to be disposed behind the screw 264 and may allow the screw 264 to rotate.

The screw 264 may be lengthily disposed in the front-rear direction X and may be connected to the motor 262 to rotate by the motor 262. The connection between the screw 264 and the motor 262 may be defined as including not only that the screw 264 is directly connected to the rotation shaft of the motor 262, but also the screw 264 is connected to the motor 264 by the power transmission member such as a gear.

The carrier 266 may linearly move along the screw 264 and include a screw body 267 in which a screw thread 267 moving along the screw 264 is disposed on an inner circumference thereof and which surrounds a portion of an outer circumference of the screw 264 and a connector 268 connected to the screw body 267 and coupled to the foot supporter 400 by a coupling member such as a screw or pin.

The carrier 266 may move in the front-rear direction X along the screw 264 at the lower portion of the foot supporter 400 to allow the foot supporter 400 to move in the front-rear direction X.

The foot supporter mover 260 is not limited to including the screw 264 and the carrier 266 as described above and may include a driving gear such as a pinion gear connected to the motor 262 and a driven gear such as a rack gear provided on the foot supporter 400. Here, the foot supporter mover 260 is not limited in type as long as the foot supporter mover 260 allows the foot supporter 400 to move in the front-rear direction X.

A lower plate 270 that is capable of guiding the forward and backward movement of the foot supporter 400 may be disposed on the main body 200. The lower plate 270 may be a foot supporter guide for guiding the foot supporter 400, and the foot supporter 400 may be disposed on the main body 200 by the lower plate 270 to move forward and backward.

The lower plate 270 may be a fixed supporter disposed on the body 200, in particular, the in housing 220 so as to guide the foot supporter 400. The lower plate 270 may be a movable supporter that is guided to the lower plate 270 to allow the lower plate 270 to move forward and backward.

The foot supporter 400 may include a protrusion 406 disposed in a backward direction, and a protrusion guide 271 that is movably seated on the lower plate 270 to guide movement of the protrusion 406 may be disposed on the lower plate 270. The protrusion guide 271 may be provided in a shape that is recessed from a top surface of the lower plate 270. The protrusion guide 271 may have a shape in which left, right, rear, and bottom surfaces are blocked, and the protrusion 406 may be guided by the protrusion guide 271 in a state of being accommodated and in contact with the protrusion guide 271.

The robot may further include a guide body 408 disposed on the foot supporter 400. The guide body 408 may be lengthily disposed in the front-rear direction X on the foot supporter 400.

The lower plate 270 may be provided with a guide rail 272 for guiding the guide body 408. The lower plate 270 may have a guide rail mounter 274 on which the guide rail 272 is mounted. The guide rail mounter 274 may be elongated in the front-rear direction X on the lower plate 270, and the guide rail 272 may be mounted on the guide rail mounter 274 and disposed in the front-rear direction X to guide the guide body 408 in the front-rear direction X.

The foot plate mover 260 may be disposed on the lower plate 270. The motor 262 may be mounted to the lower plate 270 so as to be disposed behind the screw 264.

The lower plate 270 may have at least one screw supporter 275 and 276 rotatably supporting the screw 264.

The rear wheel 250 may be rotatably disposed on the lower plate 270, and a rear wheel supporter 277 may be disposed on the lower plate 270 to rotatably support the rear wheel 250.

The rear wheel supporter 277 may be provided in pairs on the lower plate 270, and the pair of rear wheel supporters 277 may be disposed to rotatably support the rear wheel 250, in particular, the main wheel (or main frame wheel) next to the rear wheel 250. A support shaft that is lengthily disposed in the horizontal direction may be disposed on one of the rear wheel 250 and the rear wheel supporter 277, and a support shaft supporter rotatably supporting the support shaft may be disposed on the other of the rear wheel 250 and the rear wheel supporter 277.

Traveling wheel through-holes 278 and 279 through which the traveling wheels 202 and 204 rotatably pass may be defined in the lower plate 270.

The traveling wheel through-holes 278 and 279 may be defined to pass through the lower plate 270 in the vertical direction Z. The traveling wheel through-holes 278 and 279 may be provided in the lower plate 270 in a pair, and the pair of traveling wheel through-holes 278 and 279 may be spaced apart from each other in the left-right direction Y.

Each of the pair of traveling wheels 202 and 204 and the rear wheel 250 may be disposed to rotate independently with respect to each other on the main body 200 including the lower plate 270.

The front wheels 402 and 404 may be provided in a pair. The pair of front wheels 402 and 404 may be spaced apart from each other in the left-right direction Y on the foot supporter 400.

A front wheel supporter for rotatably supporting the front wheels 402 and 404 may be disposed inside the foot supporter 400. The front wheel supporter may be provided for each pair of front wheels 402 and 404.

Front through-holes 409 and 410 through which the front wheels 402 and 404 pass may be defined in the foot supporter 400. The front through-holes 409 and 410 may be defined to be opened in the vertical direction Z on the lower plate of the foot supporter 400. The front through-holes 409 and 410 may be provided in a pair in the foot supporter 400, and the pair of front through-holes 409 and 410 may be defined in the foot supporter 400 so as to be spaced apart from each other in the left-right direction.

The pair of front wheels 402 and 404 may be disposed to rotate independently with respect to each other on the foot supporter 400.

The robot may include a processor 180 that controls an overall operation of the robot, and the processor 180 may control the foot supporter mover 260 and the pair of traveling motors 206 and 208. The processor 180 may drive the motor 262 forward and backward when the footrest mover 260 is controlled.

When the motor 262 rotates the rotation shaft in one direction, the carrier 266 and the foot supporter 400 may be advanced in the forward direction, and when the motor 262 allows the rotation shaft to move in the other direction, the carrier 266 and the foot supporter 400 may be retracted in the forward direction.

Hereinafter, a reservation of the robot 100a and a use of the robot 100a will be described.

A person who wants to use the robot 100a (hereinafter, referred to as a user) may reserve boarding (i.e., use) through a terminal 100d such as a smart phone or a computing device, before boarding on the robot 100a. When reserving, the necessary accessories 800 and 900 may be requested. When the user applies for the boarding, the user may also apply for a boarding position or a destination to be boarded.

The robot 100a may further include an authentication module for authenticating/sensing a user who is allowed to use the robot 100a. The authentication module may include a scanner or a sensor that is capable of sensing an object (for example, an identification card or a bar code) of the user. The robot 100a may authenticate the user through various input interfaces 120 such as a touch screen, a microphone capable of recognizing a user's voice command, and a control panel.

The robot 100a may be managed by a person who manages the robot 100a (hereinafter, an administrator), and the robot 100a may include a sensor that is capable of recognizing an object (for example, a smart key) possessed by the manager.

The administrator may confirm a reservation item such as a boarding reservation through a computing device, and if the reservation item includes an application of the accessories 800 and 900, the applied accessories 800 and 900 are mounted on the main body 200 or the seating body 300. The manager may lock the accessories 800 and 900 through manipulation of the smart key (remote manipulator) after mounting the accessories 800 and 900.

The robot 100a may operate the locker to cause the accessories 800 and 900 to be hooked with the locker and wait for the user at the boarding position.

The user may perform user authentication through the authentication module or the input interface 120 at the boarding position.

After the user authentication is completed, the user may be seated on the seating body 300 of the robot 100a and input various commands such as a driving command through the input interface 120 such as the steering 600 or the display 700.

When the user boards, the robot 100a may determine the normal mode/special mode according to the presence or type of the accessories 800 and 900 that are currently mounted on the robot 100a, and the robot 100a may travel according to determine the mode.

The processor 180 may control the robot 100a in the normal mode and the special mode while traveling.

The normal mode may be a mode performed when no accessory is mounted to the robot 100a or a specific accessory is not mounted to the robot 100a.

An example of the normal mode may be a case in which no accessory is mounted in the robot 100a or a case in which no accessory is mounted in the accessory mounting portion 352 of the seating body 300 or the accessory mounting portion 252 of the main body 200. In this case, the processor 180 may control the traveling motors 206 and 208 and the seat body actuator 290 in the normal mode.

Another example of the normal mode may be a case in which the general accessory other than the specific accessory is mounted on the robot 100a. The general accessory may be an accessory that does not require special attention for traveling or operating the robot, and an example of the general accessory may be the sub armrest 800B illustrated in FIG. 8.

When the accessory 100 is attached to the accessory mounting portion instead of the specific accessory, the robot 100a may perform the normal mode without executing the special mode.

The special mode may be a mode performed when a specific accessory is mounted on the robot 100a.

When the specific accessory is mounted on the accessory mounting portion 252 or 352, the processor 180 may control the traveling motors 206 and 208 and the seat body actuator 290 in the special mode different from the normal mode.

The specific accessory in which the robot 100a performs the special mode may be an accessory mounted to the robot 100a for a special purpose and may be an accessory that requires special attention to the operation of the robot. For example, the cup holder 800A, the baggage supporter 900A, the clothing device supporter 900B, or the like may be specific accessories in which the robot 100a performs the special mode.

That is, the robot 100a may selectively perform the normal mode and the special mode according to the type of accessory mounted on the accessory mounting portion.

For example, when the sub armrest 800B is disposed on the accessory mounting portion 352 of the armrest, the processor 180 may control the traveling motors 206 and 208 and the seat body actuator 290 in the normal mode.

On the other hand, when the cup holder 800A is disposed in the accessory mounting portion 352 of the armrest, the processor 180 may control the traveling motors 206 and 208 and the seat body actuator 290 in the special mode.

The special mode of the robot may be different depending on the type of the accessories 800 and 900 mounted on the accessory mounting portions 252 and 352. That is, the robot may selectively implement a plurality of special modes and may implement different special modes different from each other depending on the type of the accessories 800 and 900.

When the cup holder 800A is disposed on the accessory mounting portion 352 of the armrest, the processor 180 may control the traveling motors 206 and 208 and the seat body actuator 290 in the special mode (hereinafter, referred to as a cup holder special mode) for the cup holder.

When the baggage supporter 900A is disposed on the accessory mounting portion 252 of the main body, the processor 180 may control the traveling motors 206 and 208 and the seat body actuator 290 in the special mode (particularly, referred to as a baggage supporter special mode) for the baggage supporter.

When the medical device supporter 900B is disposed on the accessory mounting portion 252 of the main body, the processor 180 may control the traveling motors 206 and 208 and the seat body actuator 290 in a special mode (hereinafter, referred to as a medical device supporter special mode) for the medical device supporter 900B.

When the robot 100a travels, the robot may travel in the normal mode, the cup holder special mode, the baggage supporter special mode, the medical device supporter special mode, and the like. Hereinafter, various special modes will be described later.

On the other hand, when the robot 100a is traveling or is paused before the robot 100a arrives at the destination, the user or an outsider may attempt to separate the accessories 800 and 900 at random.

The processor 180 may transmit a signal related to random separation to an output interface 150 such as a speaker until the number of attempts for separation randomly occurs, and the output interface 150 such as a speaker may generate voice guidance related to random separation (for example, accessories may not be separated at random).

The processor 180 may stop the operation of the robot 100a when the number of random separation attempts is greater than or equal to a predetermined number of times and then transmit information on the random separation attempt to the administrator's computing device or the terminal.

After the administrator checks whether the attempt is made to be separated randomly, the administrator may input instructions for the attempt to be separated randomly through the computing device or the terminal, and the robot 100a may generate information about countermeasures with respect to the attempt to be separated randomly through the output interface 150 such as a speaker.

The robot 100a may reach the destination without stopping when the attempt of arbitrary separation is less than the set number of times, and the user may descend from the seating body 300 after reaching the destination.

The robot 100a may perform the boarding limit mode after the service ends.

The boarding limit mode is a mode in which a portion of the robot 100a is deformed to a position that limits the outsider's boarding and may be a mode for inducing the outsider to sit on the seating body 300. The robot 100 may switch the whole or a portion of the robot into a state in which it is inconvenient to board so as to maintain the boarding limit state in the boarding limit mode. For example, the robot may have the backrest 320 rotating or moving over the seat body 310 by a backrest motor, and the robot 100a may be in a state in which the outsider/user is difficult to be seated on the seat body 310 by the backrest 320.

The robot 100a may move to a charging station while maintaining the boarding limit mode and may be charged by the charging station.

The administrator may access the robot 100a with the smart key while the robot 100a is charging or after the charging is completed, and the robot senses the proximity of the smart key to unlock the accessories 800 and 900. The administrator may separate the unlocked accessories 800 and 900 from the seating body 300 or the main body 200.

Figure 18:
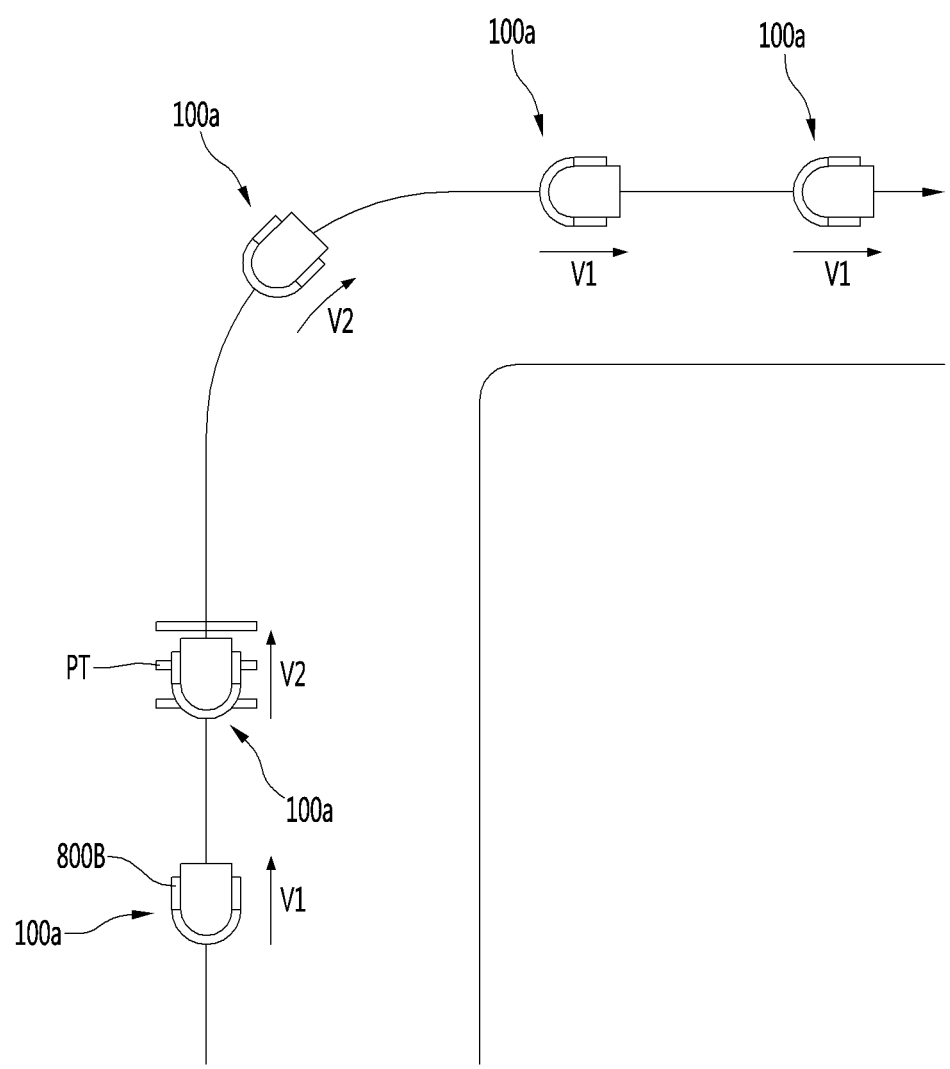
FIG. 18 is a plan view when the robot travels in a normal mode according to an embodiment.
Figure 19:
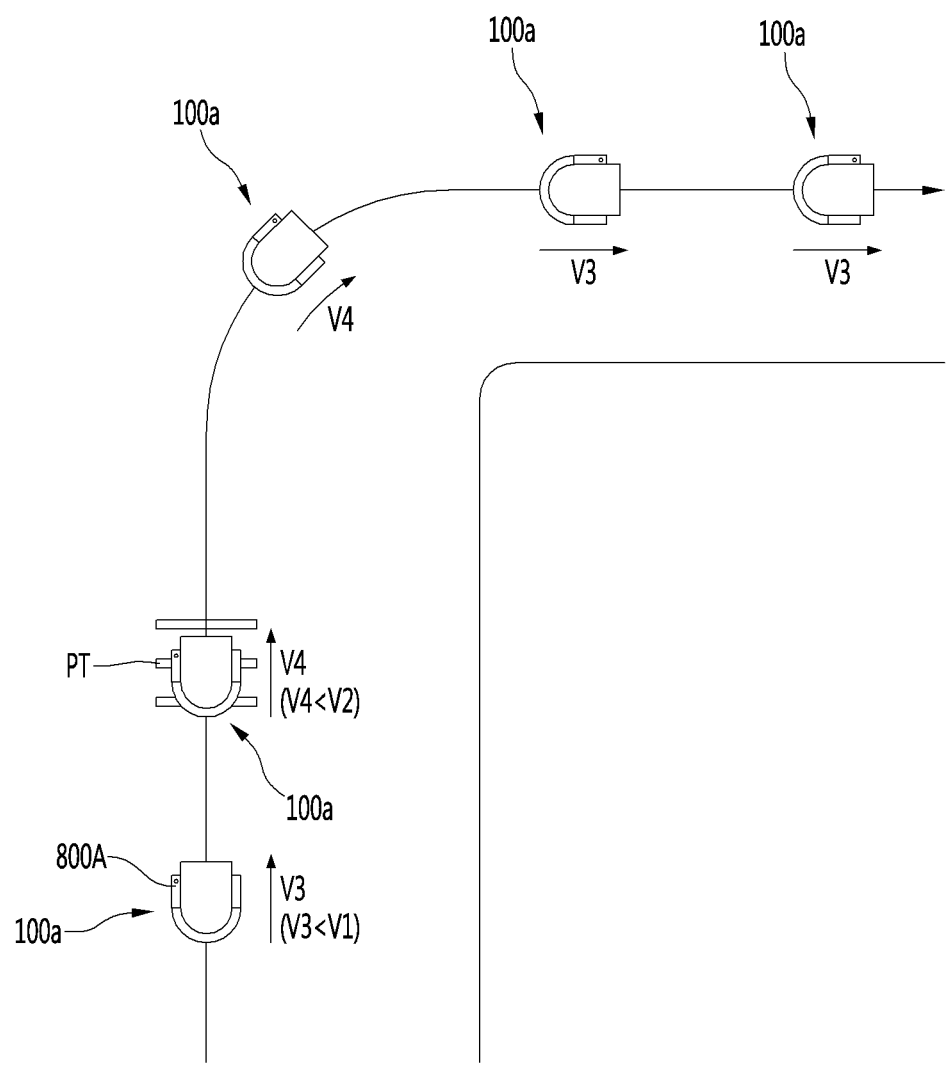
FIG. 19 is a plan view when the robot travels in a cup holder special mode according to an embodiment.

FIG. 18 is a plan view when the robot travels in the normal mode according to an embodiment, and FIG. 19 is a plan view when the robot travels in the cup holder special mode according to an embodiment.

When the cup holder 800A is not mounted on the accessory mounting portion 352 of the robot 100a, and the sub armrest 800B is mounted, the robot 100a may operate in the normal mode as illustrated in FIG. 18.

The processor 180 may drive the traveling motors 206 and 208 at a first speed V1 in the normal mode during the normal traveling (e.g., forward traveling). The processor 180 may drive the traveling motors 206 and 208 at a second speed V2 in the normal mode while the main body 200 rotates over a protrusion PT provided on the floor or while the main body 200 rotates.

When the cup holder 800A is mounted on the accessory mounting portion 352 of the robot 100a instead of the sub armrest 800B, the robot 100a may operate in the cup holder special mode, as illustrated in FIG. 19.

The processor 180 may drive the traveling motors 206 and 208 at a third speed V3 in the cup holder special mode during the normal traveling (e.g., forward traveling). The processor 180 may drive the traveling motors 206 and 208 at a fourth speed V4 in the cup holder special mode while the main body 200 rotates over the protrusion PT provided on the floor or while the main body 200 rotates.

The third speed V3 may be a speed set to be slower than the first speed V1.

The third speed V3 (e.g., about 0.6 m/sec) may be slower than the first speed V1 (e.g., 0.7 m/sec) in the normal mode.

The fourth speed V4 may be a speed set to be slower than the second speed V2.

The fourth speed V4 (e.g., about 0.4 m/sec) may be slower than the second speed V2 (e.g., 0.5 m/sec) in the normal mode.

In the cup holder special mode, the robot 100a may travel at a lower speed than a speed in the normal mode, and the shaking or overflow of a beverage contained in the cup holder 800A may be minimized. Thus, the robot 100a may allow the user (i.e., rider) to more safely transport the beverage.

On the other hand, the robot 100a may drive the slopes C and D in a state in which the sub armrest 800B is mounted on the accessory mounting portion 352. The processor 180 may maintain the seat body actuator 290 in the normal mode (non-tilting mode), and the seat body 310 may be in a tilted state like the main body while traveling along the slopes C and D.

On the other hand, the robot 100a may travel along the slopes C and D while the accessory holder 352 is equipped with the cup holder 800A, and the processor 180 may control the seat body actuator 290 in the cup holder special mode (tilting mode). As illustrated in FIGS. 13 and 14, the seat body 310 may be titled with respect to the main body 200 and thus be switched into an approximately horizontal state in the front-rear direction X. That is, in the cup holder special mode, the processor 180 may operate the seat body actuator 290 so that the seat body 310 is disposed approximately horizontally.

As described above, if the seat body 310 is maintained horizontally while the robot 100a passes over the slope C, the overflow of the beverage or the like contained in the cup holder 800A may be minimized, and the robot may more safely transport the rider.

Figure 20:
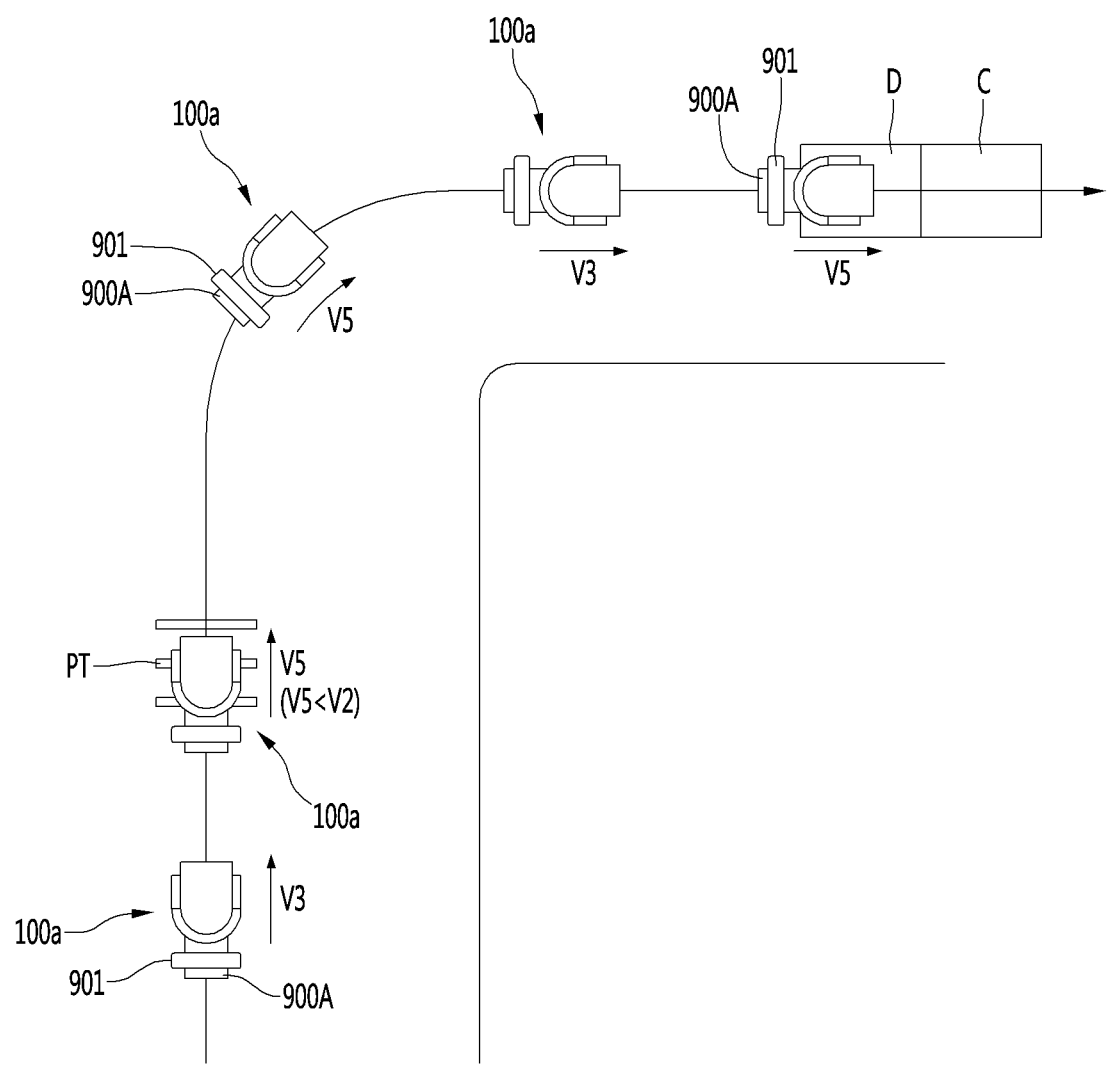
FIG. 20 is a plan view when the robot travels in a baggage supporter special mode according to an embodiment.

FIG. 20 is a plan view when the robot travels in the baggage supporter special mode according to an embodiment.

In a state in which the baggage supporter 900A is mounted on the accessory mounting portion 252, the main body 200 of the robot 100a may rotate, pass over the protrusion PT, or travels along the slopes C and D.

When the baggage supporter 900A is mounted on the accessory mounting portion 252, the main body 200 may rotate, the main body 200 may pass over the protrusion PT, or the main body 200 may travel along the slope C. The robot may perform the baggage supporter special mode, and the processor 180 may drive the traveling motors 206 and 208 at a lower speed than a speed in the normal mode. An example in which the processor 180 drives the traveling motors 206 and 208 at a lower speed than a speed in the normal mode is the same as or similar to that when the cup holder 800A is mounted in the accessory mounting portion 352, and thus, detailed description will be omitted.

In the state in which the baggage supporter 900A is mounted on the accessory mounting portion 252, the case in which the main body 200 rotates, the main body 200 passes over the protrusion PT, or the main body 200 travels along the slope C may be a condition under which the baggage supporter special mode is implemented.

In the baggage supporter special mode, the processor 180 may drive the traveling motors 206 and 208 at the third speed V3 in the baggage supporter special mode during the normal traveling (e.g., forward traveling). When the main body 200 rotates, the main body 200 passes over the protrusion PT, or the main body 200 travels along the slopes C and D, the traveling motors 206 and 208 may be driven at the fifth speed V5 in the baggage support special mode.

While the main body 200 is rotating in the state in which the baggage supporter 900A is mounted on the accessory mounting portion 252, the processor 180 may drive the traveling motors 206 and 208 at a lower speed V5 than a speed in the normal mode.

While the main body 200 passes over the protrusion PT in the state in which the baggage supporter 900A is mounted on the accessory mounting portion 252, the processor 180 may drive the traveling motors 206 and 208 at a lower speed V5 than a speed in the normal mode.

While the main body 200 travels along the slopes C and D in the state in which the baggage supporter 900A is mounted on the accessory mounting portion 252, the processor 180 may drive the traveling motors 206 and 208 at a lower speed V5 than a speed in the normal mode.

When the baggage supporter 900A is mounted on the accessory mounting portion 252, the speed V5 while the main body 200 rotates, the speed V5 while the main body 200 passes over the protrusion PT, and the speed V5 while the main body 200 travels along the slopes C and D will be described as the same example. However, this embodiment is not limited to these speeds being the same. For example, the speeds may be different from each other.

When the baggage supporter 900A is not mounted on the accessory mounting portion 252, the processor 180 may drive the traveling motors 206 and 208 at the second speed V2 in the normal mode while the main body 200 rotates, the main body 200 passes over the protrusion PT, or the main body 200 travels along the slope C.

On the other hand, In the state in which the baggage supporter 900A is mounted on the accessory mounting portion 252, the traveling motors 206 and 208 may be driven at the fifth speed V5 in the baggage supporter special mode while the main body 200 rotates, the main body 200 passes over the protrusion PT, or the main body 200 travels along the slopes C and D.

The case in which the traveling motors 206 and 208 are driven at the second speed V2 in the normal mode may be the same as that illustrated in FIG. 18, and thus description thereof will be omitted to avoid overlapping description.

The fifth speed V5 may be a speed set to be slower than the second speed V2. The fifth speed V5 (e.g., about 0.3 m/sec) may be slower than the second speed V2 (e.g., about 0.5 m/sec) in the normal mode.

In the baggage supporter special mode, the robot 100a may travel at a lower speed than a speed in the normal mode, the shaking or separation of the baggage 901 mounted on the baggage supporter 900A may be minimized, and the robot 100a may more quickly and safely transport the baggage 901.

Figure 21:
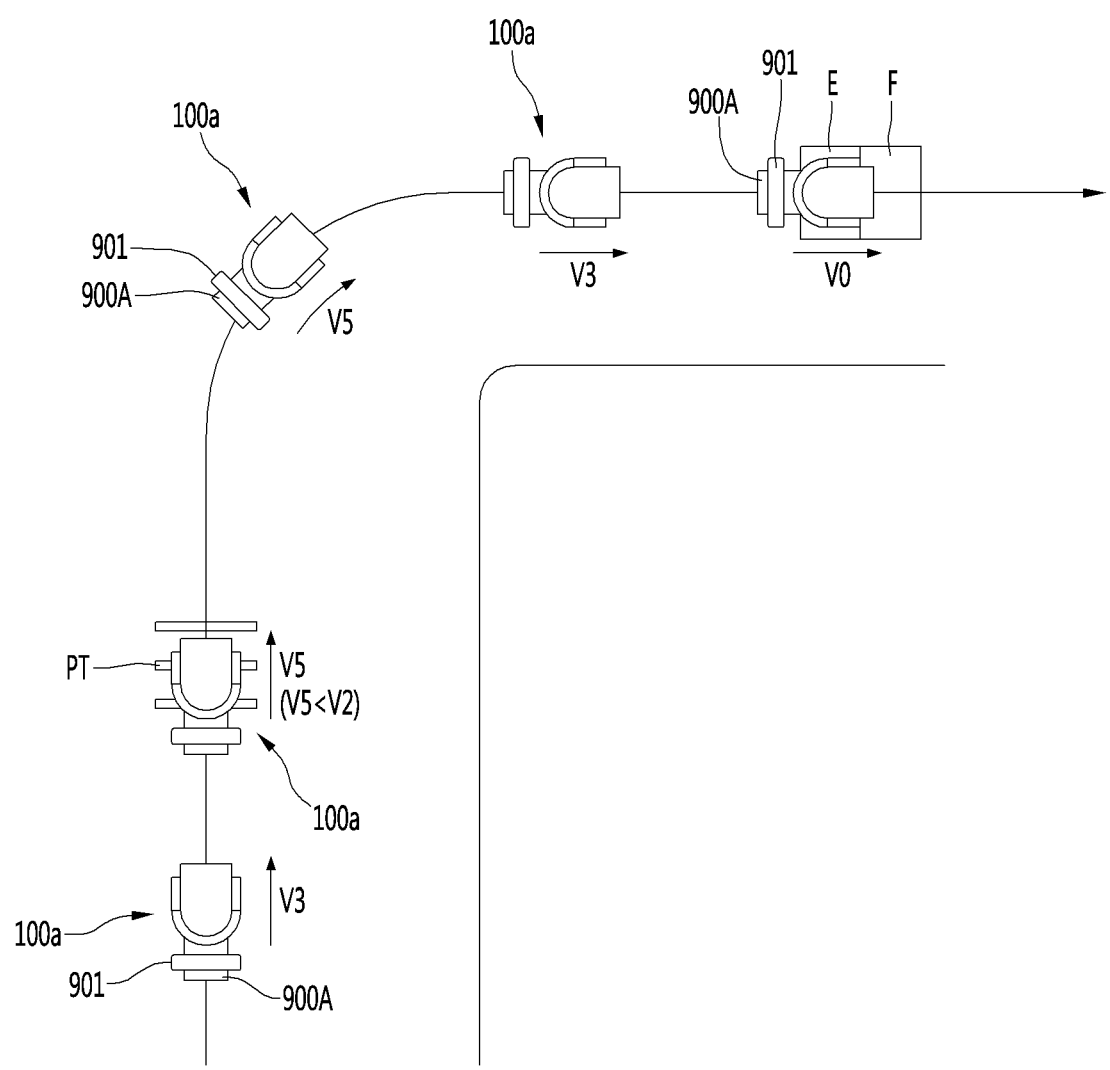
FIG. 21 is a plan view illustrating another example when the robot travels in the baggage supporter special mode according to an embodiment.

FIG. 21 is a plan view illustrating another example when the robot travels in the baggage supporter special mode according to an embodiment.

When the baggage supporter 900A is mounted on the accessory mounting portion 252, and the main body 200 travels along slopes E and F that is inclined at an angle equal to or greater than a set angle, the processor 180 may drive the traveling motors 206 and 208 at a minimum speed Vo while traveling along the slopes E or F that is inclined at an angle equal to or greater than the set angle.

The set angle is an angle having a high inclination angle with respect to the ground and may be set to a specific angle, for example, about 15°.

The minimum speed Vo of each of the traveling motors 206 and 208 may be a speed at which the robot 100a travels at the lowest speed when the robot 100a travels, for example, at a specific speed such as about 0.1 m/sec.

The robot 100a may travel along the gentle slopes C and D while the baggage supporter 900A is mounted on the accessory mounting portion 252. If an angle of each of the traveling slopes C and D is less than the set angle, the traveling motors 206 and 208 may be driven at a speed faster than the minimum speed Vo (e.g., the fifth speed V5).

The robot 100a may travel along the steep slopes E and F while the baggage supporter 900A is mounted on the accessory mounting portion 252. If an angle of each of the traveling slopes E and F is less than the set angle, the traveling motors 206 and 208 may be driven at the minimum speed Vo.

Figure 22:
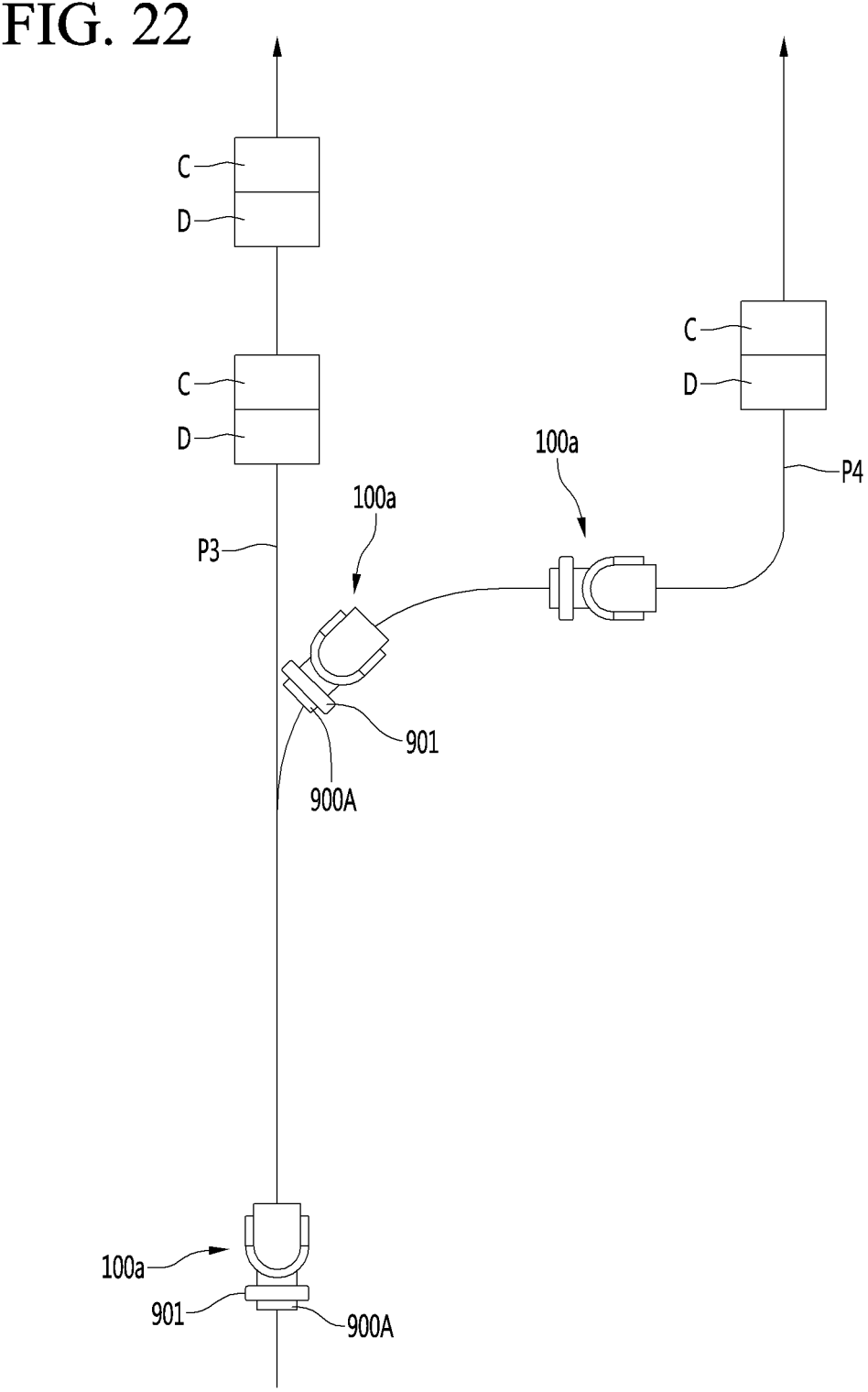
FIG. 22 is a plan view illustrating further another example when the robot travels in the baggage supporter special mode according to an embodiment.

FIG. 22 is a plan view illustrating further another example when the robot travels in the baggage supporter special mode according to an embodiment.

When the baggage supporter 900A is mounted on the accessory mounting portion 252, and the baggage 901 is mounted on the baggage supporter 900A, the processor 180 may allow the main body 200 to travel along a traveling path P4, in which the slopes C and D are not provided or minimized, among a plurality of traveling paths P3 and P4.

The robot 100a may travel in a self-traveling manner from the boarding position to the destination, and in this case, the plurality of traveling paths may exist between the boarding position and the destination.

A traveling path, in which an entire traveling distance is shortest, or an entire traveling time is shortest, among the plurality of traveling paths may be determined as the traveling path P3 of the robot 100a. When the number of slopes C and D of the determined traveling path P3 is greater than the number of slopes of the other traveling path P4, the other traveling path P4 having the relatively small number may be determined as the final traveling path.

Figure 23:
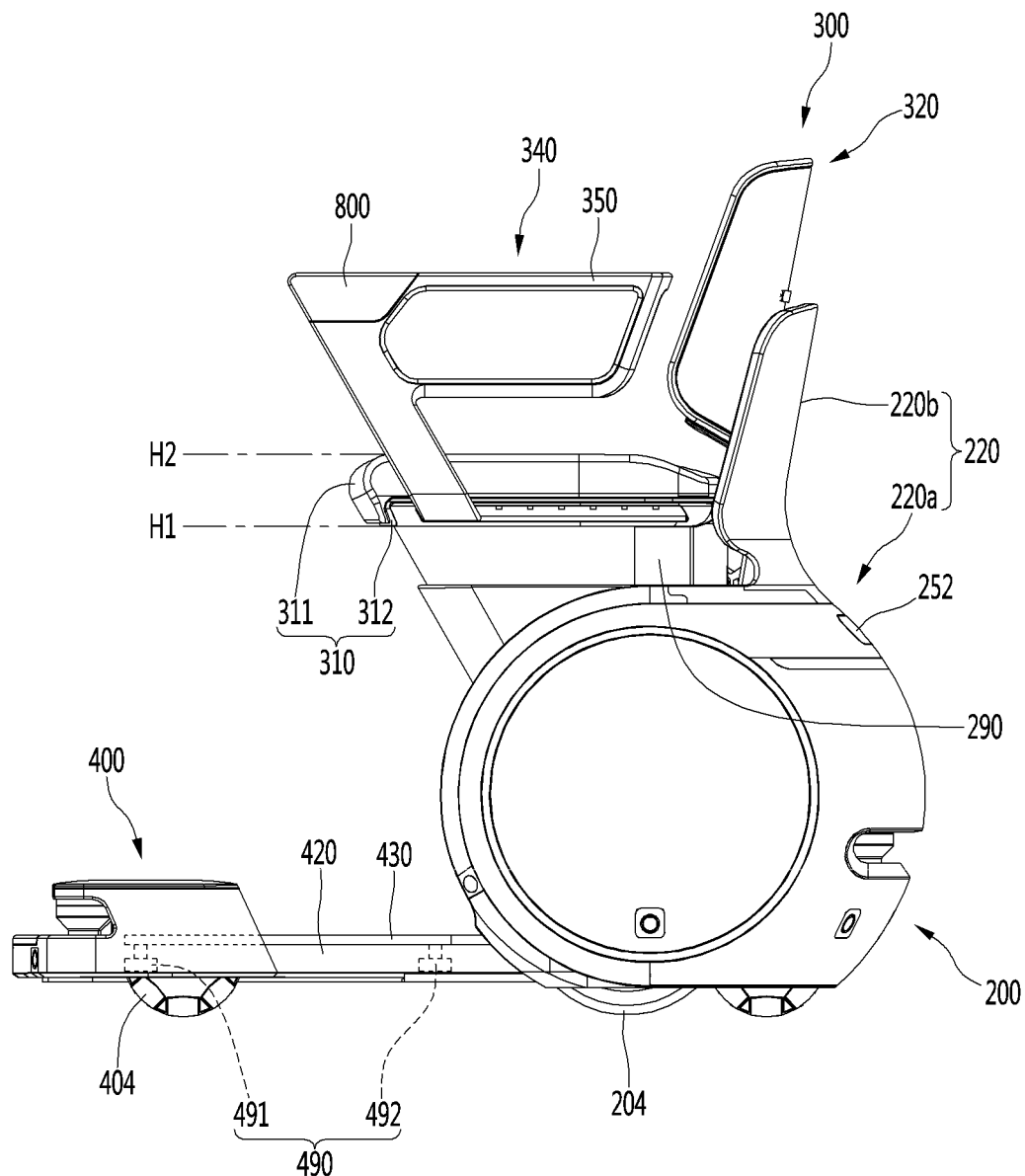
FIG. 23 is a side view illustrating another example of the foot supporter according to an embodiment.
Figure 24:
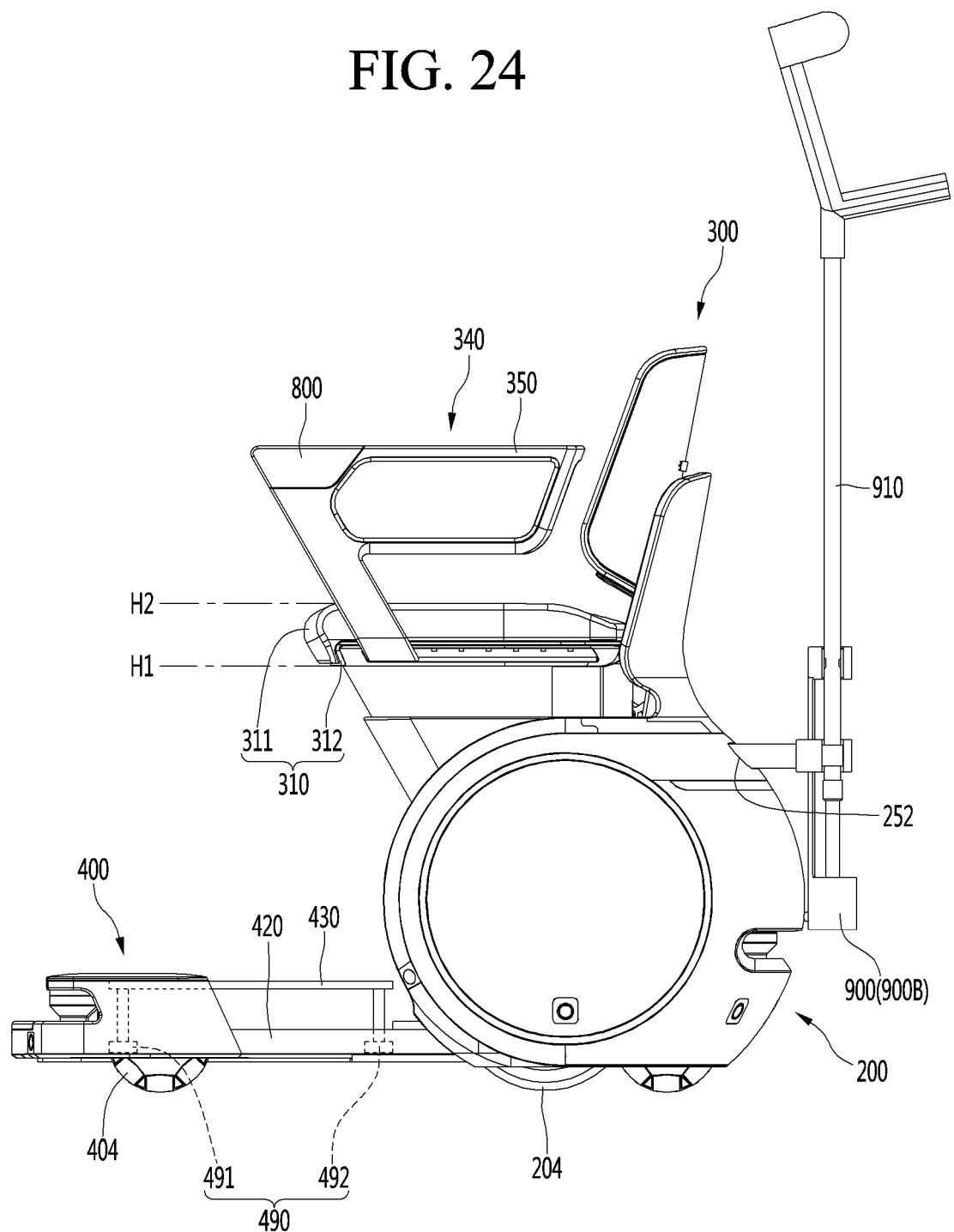
FIG. 24 is a side view when the medical device supporter is mounted, and the foot supporter ascends according to an embodiment.

FIG. 23 is a side view illustrating another example of the foot supporter according to an embodiment. FIG. 24 is a side view when the medical device supporter is mounted, and the foot supporter ascends according to an embodiment, and FIG. 25 is a side view when the medical device supporter is mounted, and the foot supporter is tilted according to an embodiment.

Figure 25:
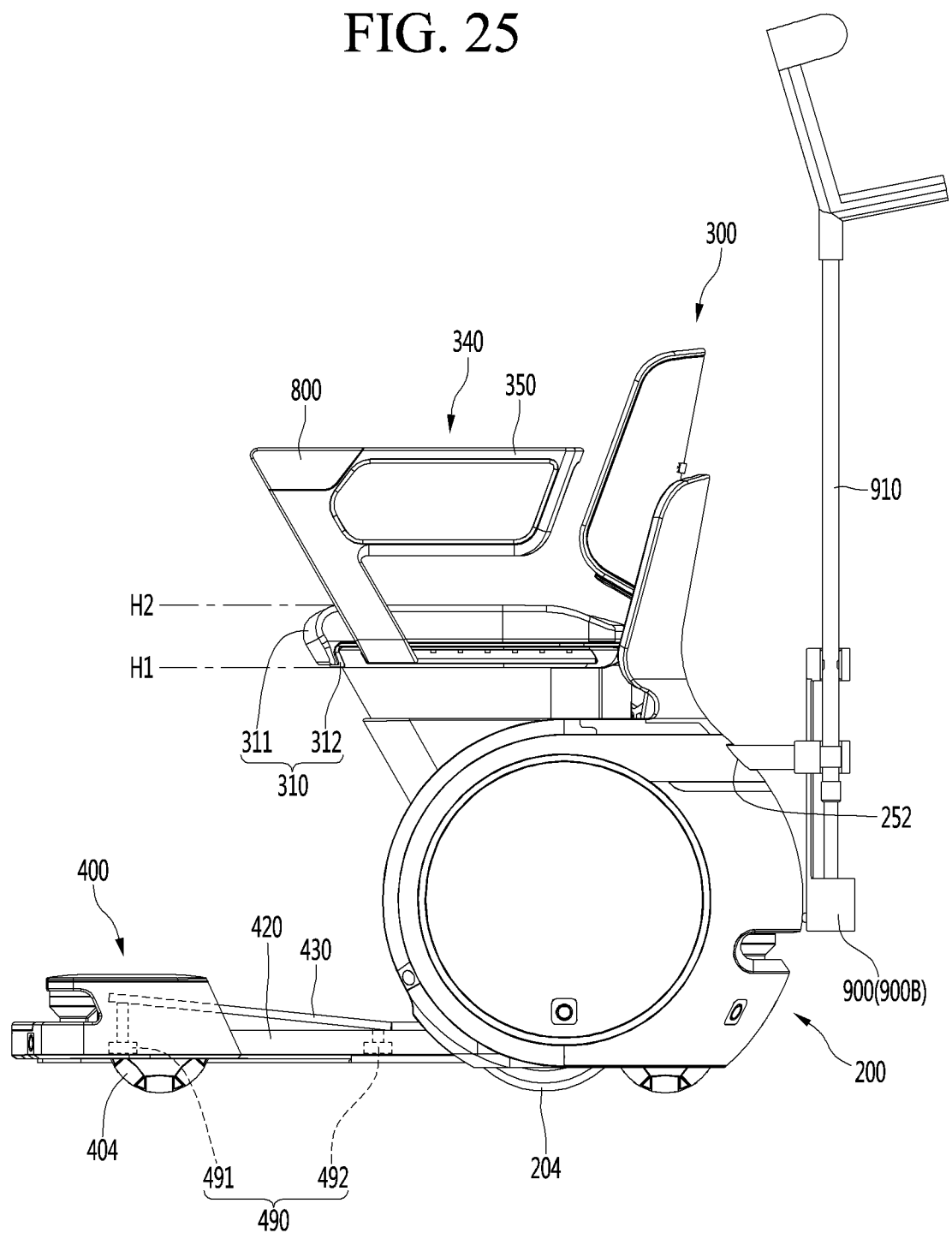
FIG. 25 is a side view when the medical device supporter is mounted, and the foot supporter is tilted according to an embodiment.

As illustrated in FIGS. 23 to 25, the robot 100a may be configured to allow at least one of the height and angle of the foot supporter 400 to be adjustable may further include a footrest actuator that is capable of adjusting the height or angle of the foot supporter 400.

An example in which the height of the foot supporter 400 is adjusted may be a case in which a height of a portion of the foot supporter 400, on which the user's foot is spaced, is adjusted.

An example in which the angle of the foot supporter 400 is adjusted may be a case in which an angle of a portion of the foot supporter 400, on which the user's foot is spaced, is adjusted.

The foot supporter 400 may include a lower footrest 420 and an upper footrest 430 disposed on the lower footrest 420, and the footrest actuator 490 may elevate or tilt the upper footrest 430.

The footrest actuator 490 may have the same or similar structure as the seat body actuator 290 and may include a front cylinder 491 and a rear cylinder 492, which are spaced apart from each other in the front-rear direction X on the lower footrest 420.

The front cylinder 491 may be disposed in the lower footrest 430 and may be disposed to elevate a front portion of the upper footrest 430.

The rear cylinder 492 may be disposed in the lower footrest 430 and may be disposed to elevate a rear portion of the upper footrest 430.

When the front cylinder 491 and the rear cylinder 492 elevate the upper footrest 430 together, the total height of the upper footrest 430 may increase as shown in FIG. 24.

If the height at which the front cylinder 491 allows the front portion of the upper footrest 430 to ascend is higher than the height at which the lower cylinder 492 allows the rear portion of the upper footrest 430 to ascend, the upper footrest 430 may be tilted at a predetermined angle with respect to the lower footrest 420 toward a rear upper side, and an angle of the upper footrest 430 may vary as illustrated in FIG. 25.

When the medical device supporter 900B is mounted on the accessory mounting portion 252, the robot 100a may perform the special mode of the medical device supporter that assists the user to be easily seated on the seating body 300.

The robot 100a may wait for the user at the boarding position after moving to the boarding position while the medical device supporter 900B is mounted, and the robot 100a may initiate the medical device supporter special mode while waiting for the user at the boarding position or during the boarding position.

The medical device supporter special mode may be a boarding mode for adjusting the height or angle of the foot supporter 400 or adjusting the position of the armrest body 350 so that the user is seated on the seat body 310 in the most comfortable posture.

As illustrated in FIG. 23, when the height of the upper footrest 430 is low, and the upper footrest 430 is disposed substantially horizontally, the robot 100a may be defined as being in the normal mode. In addition, when the armrest body 350 moves forward to the advance position P1 (see FIG. 15), the robot 100a may be defined as being in the normal mode.

Hereinafter, the medical device supporter special mode will be described in detail.

The processor 180 may control the footrest actuator 490 so that the angle or height of the foot supporter 400 is adjusted in the medical device supporter special mode.

As an example of the medical device supporter special mode, as illustrated in FIG. 24, the processor 180 may control the footrest actuator 490 in an ascending mode. As illustrated in FIG. 24, the footrest actuator 490 may allow the upper footrest 430 to ascend, and the height of the upper footrest may be higher than a height in the normal mode illustrated in FIG. 23.

As another example of the medical device supporter special mode, as illustrated in FIG. 25, the processor 180 may control the footrest actuator 490 in a tilting mode. As illustrated in FIG. 25, the footrest actuator 490 may adjust an angle of the upper footrest 430, and the inclination of the upper footrest may be higher than an inclination in the normal mode illustrated in FIG. 23.

As described above, when the upper footrest 430 ascends or is tilted, the user may place the foot more comfortably on the upper footrest 430.

In another example of the medical device supporter special mode, the processor 180 may control the armrest body mover to allow the armrest body 350 to move backward to the retreat position P2 as illustrated in FIG. 15, and the armrest body 350 may be disposed behind the advance position P1.

As illustrated in FIG. 15, when the armrest body 350 moves backward, the user may be seated on the seating body 300 in a comfortable posture in front of or on the side of the seating body 300.

Figure 26:
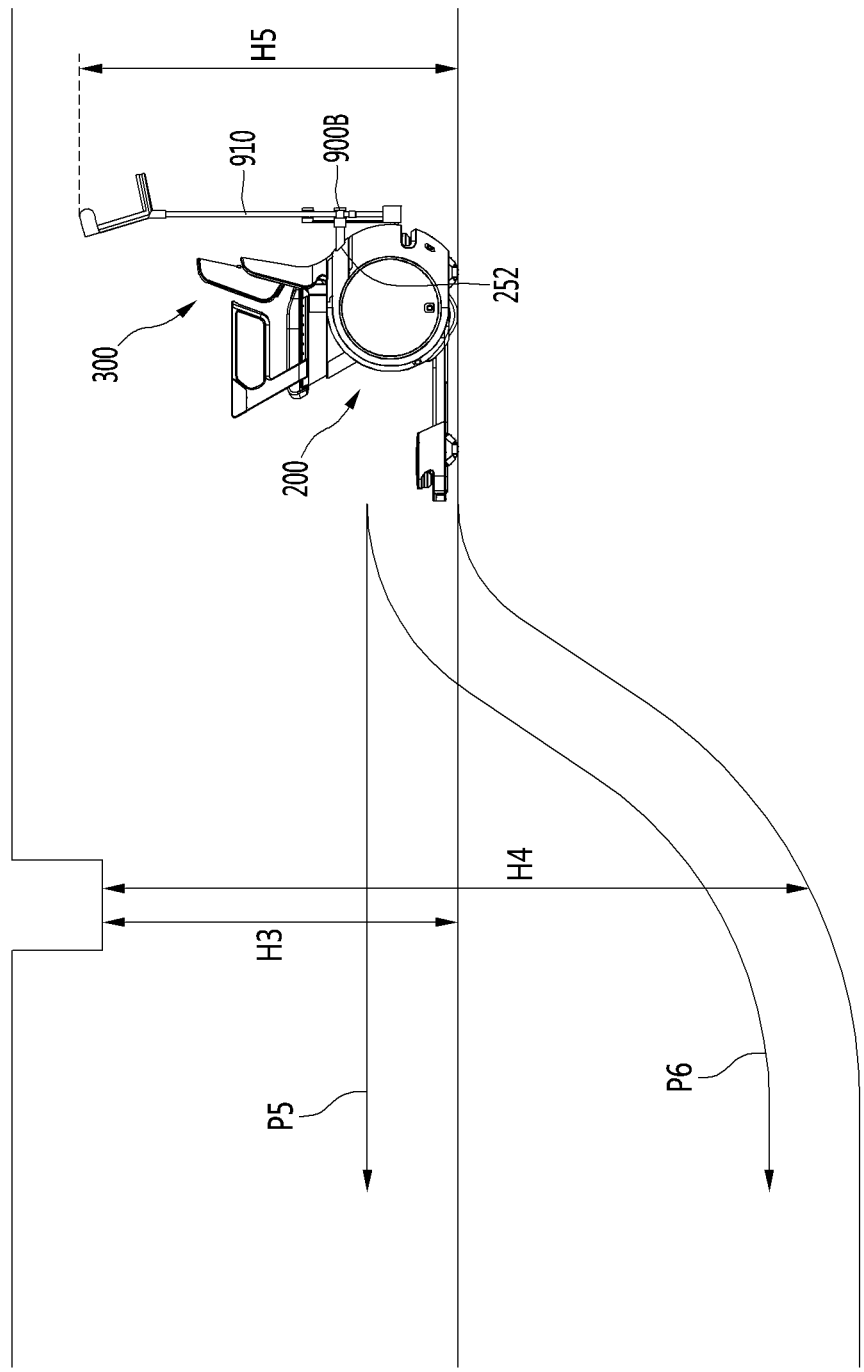
FIG. 26 is a view illustrating a traveling path of the robot when the medical device supporter is mounted on the robot according to an embodiment.
Figure 27:
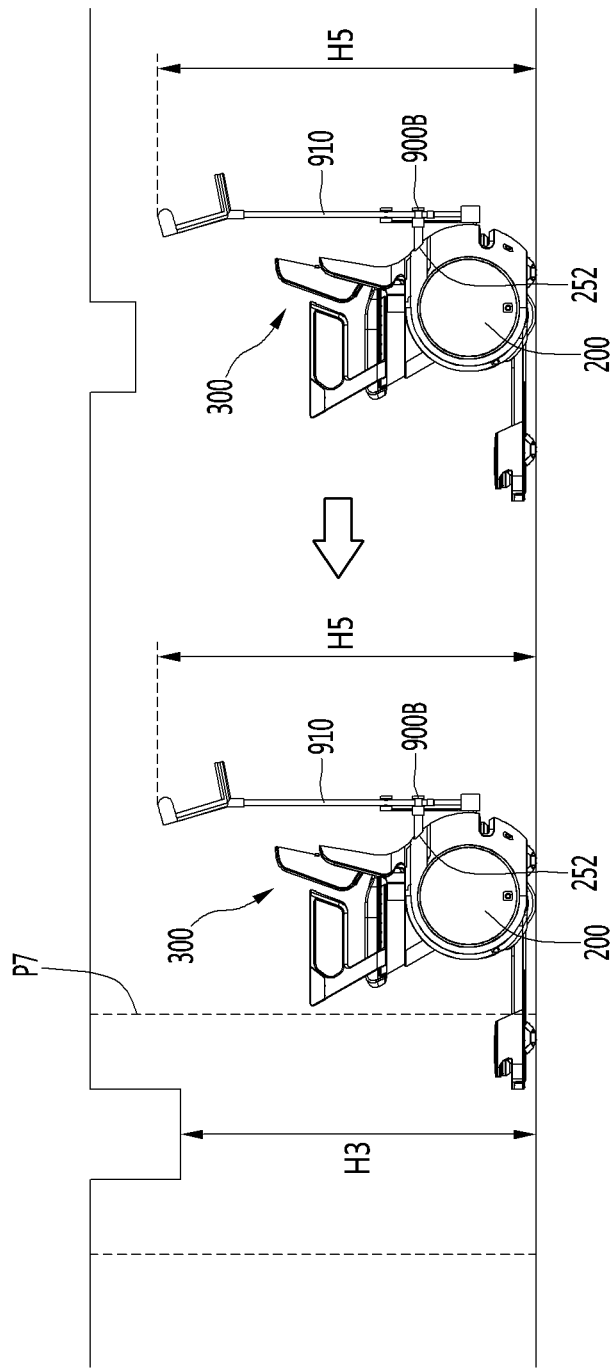
FIG. 27 is a view illustrating an example in which the robot is stopped when the medical device supporter is mounted on the robot according to an embodiment.

FIG. 26 is a view illustrating the traveling path of the robot when the medical device supporter is mounted on the robot according to an embodiment, and FIG. 27 is a view illustrating an example in which the robot is stopped when the medical device supporter is mounted on the robot according to an embodiment.

When the medical device supporter 900B is mounted on the accessory mounting portion 252, the processor 180 may allow the main body to travel along a traveling path P6, in which each of minimum heights H3 and H4 of a ceiling is greater than or equal to a set height H5, among a plurality of selectable traveling paths P5 and P6.

The set height H5 may be set to a height from a bottom surface to a top surface of the medical device 910 when the medical device 910 is mounted on the medical device supporter 900B.

As illustrated in FIG. 26, the plurality of traveling paths P5 and P6 through which the robot 100a reaches the destination may include a first traveling path P5 in which a minimum height H3 of the ceiling is low and a second traveling path P6 in which a minimum height H4 of the ceiling is high. When the ceiling minimum height H3 of the first travel path P5 is equal to or less than the set height H5, and the ceiling minimum height H4 of the second travel path P6 exceeds the set height, the processor 180 may allow the main body 200 to travel along the second driving path P6 without traveling along the first driving path P5.

As described above, when the main body 200 travels in consideration of the height of the medical device 910, damage or safety accidents of the medical device 910 that may occur when the main body 200 travels may be minimized.

When the medical device supporter 900B is mounted on the accessory mounting portion 252, and there is no traveling path in which the minimum height of the ceiling exceeds the set height H5 among the plurality of selectable traveling paths, as illustrated in FIG. 27, the processor 180 may allow the main body 200 to travel along the traveling path in which the minimum height H3 of the ceiling is less than the set height H5. Here, the main body 200 may travel in front of the position P7 at which the height of the ceiling is less than the set height H5 (i.e., a position at which the height of the ceiling is less than the set height H5) and then be stopped.

Figure 28:
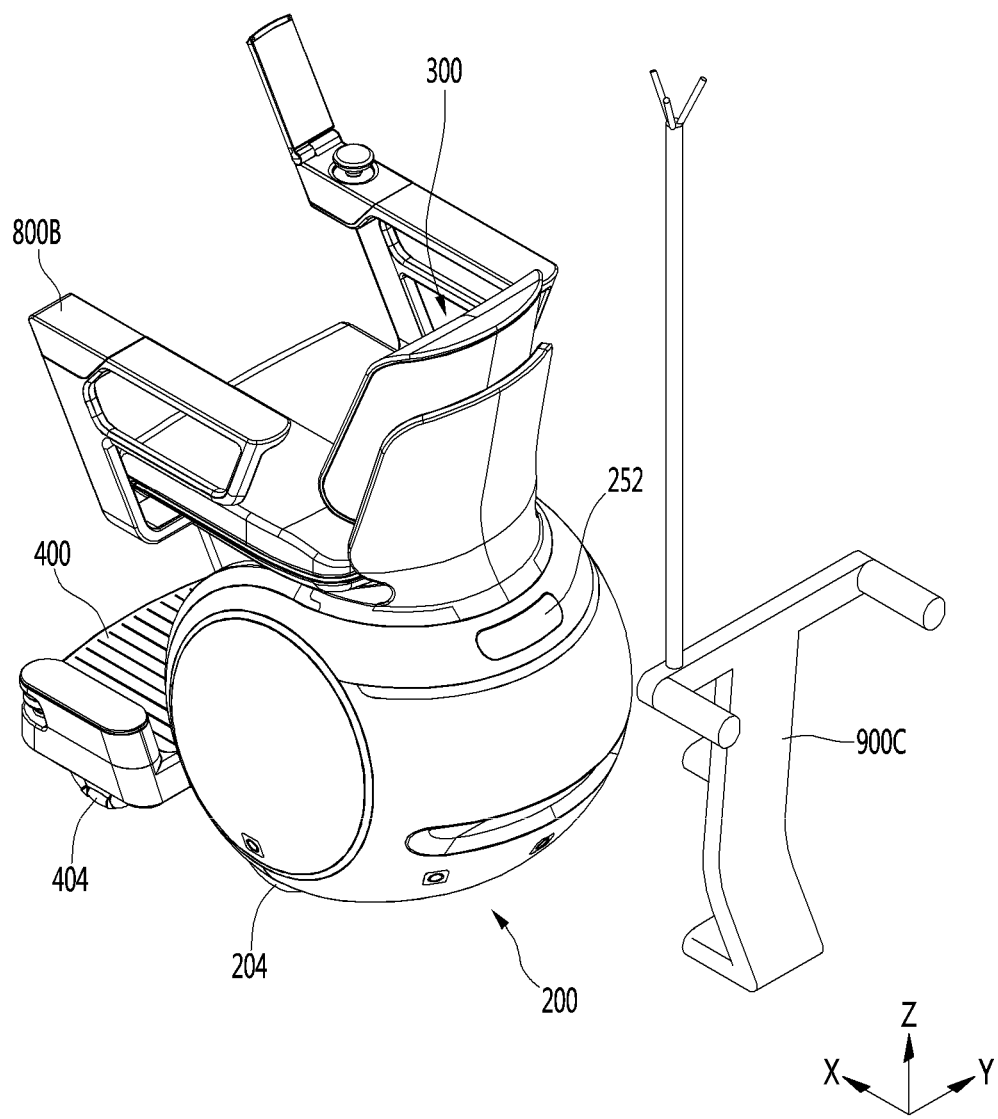
FIG. 28 is a view illustrating the robot and a medicine supporter according to an embodiment.

FIG. 28 is a view illustrating the robot and a medicine supporter according to an embodiment.

The plurality of accessories 900 may include a medicine supporter 900C that is separably mounted to the accessory mounting portion 252 and to which the medicine is mounted.

An example of a medicine that is mounted on the medicine supporter 900C may be a pack containing a liquid medicine, such as ringer.

When the medicine supporter 900C is mounted on the robot 100a, the robot 100a may operate in the same or similar special mode as when the baggage supporter 900A is mounted on the robot 100a.

When the medicine supporter 900C is mounted on the robot 100a, the robot 100a may travel while the medicine supporter 900c is mounted. As illustrated in FIG. 20, the processor 180 may drive the traveling motor 206 at a lower speed V5 (V5<V2) that a speed in the normal mode while the main body 200 rotates, the main body 200 passes over the protrusion PT, or the main body 200 travels along the slopes C and D.

When the medicine supporter 900C is mounted on the robot 100a, as illustrated in FIG. 21, if the main body 200 travels along slopes E and F that is inclined at an angle equal to or greater than a set angle, the processor 180 may drive the traveling motors 206 and 208 at a minimum speed Vo while the main body 200 travels along the slopes E or F that is inclined at an angle equal to or greater than the set angle.

When the medicine supporter 900C is mounted on the robot 100a, as illustrated in FIG. 22, the processor 180 may allow the main body 200 to travel along the traveling path P4 in which the slopes C and D are not provided or minimized, among a plurality of traveling paths P3 and P4.

Various special modes executed by the robot 100a may include a shopping mode. In the shopping mode, the processor 180 may allow the main body 20 to travel along a traveling path that passes through a region of low congestion among the plurality of selectable traveling paths. In the shopping mode, the processor 180 may drive the traveling motors 202 and 204 at a lower speed (V4<V2) than a speed in the normal mode as illustrated in FIG. 19. In the shopping mode, as illustrated in FIG. 12, the processor 180 may control the seat body actuator 290 in the ascending mode in which the seat body 310 ascends to a shopping height (e.g., the second position H2).

Figure 29:
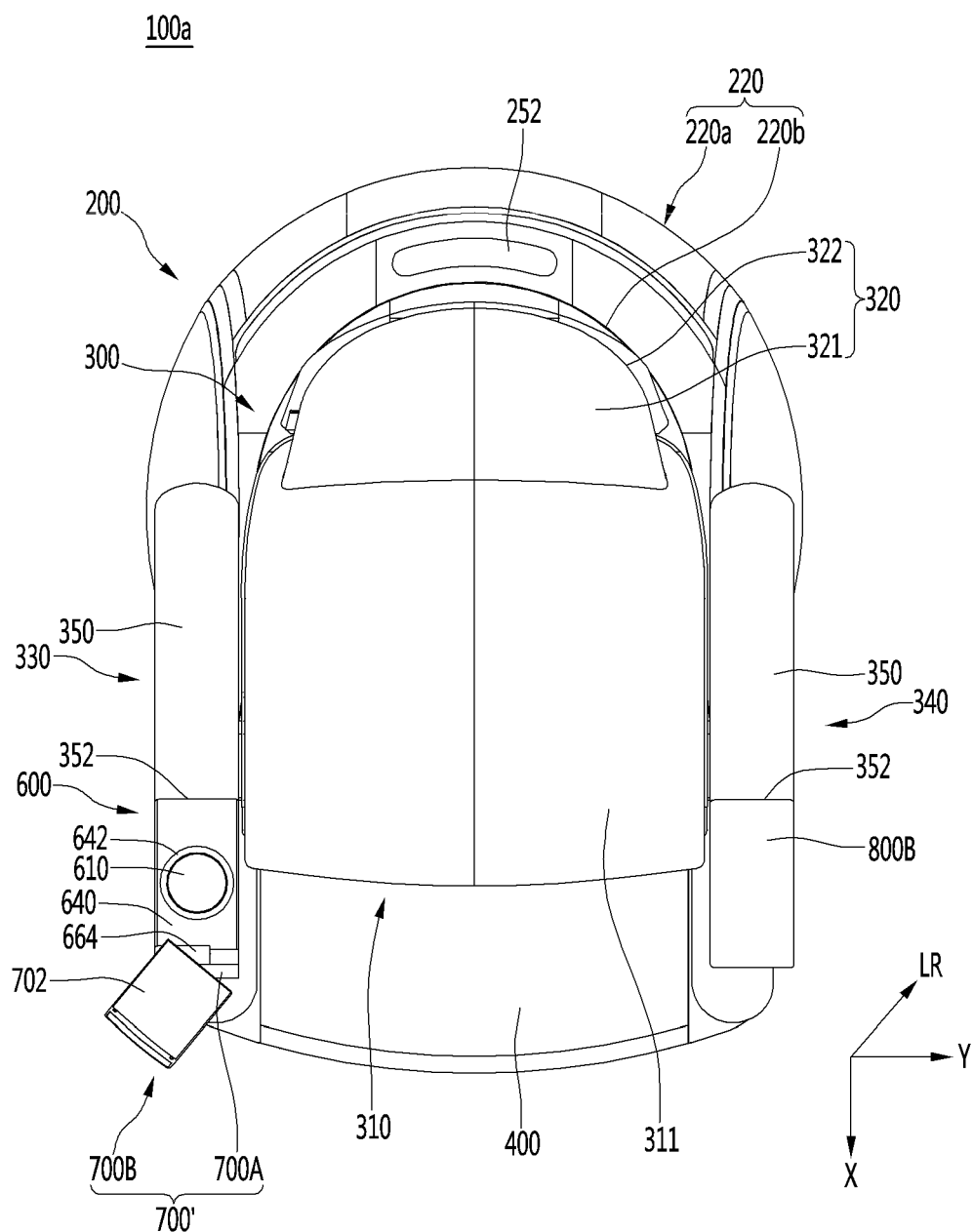
FIG. 29 is a plan view when another display is disposed at a right side of a seating body according to an embodiment.
Figure 30:
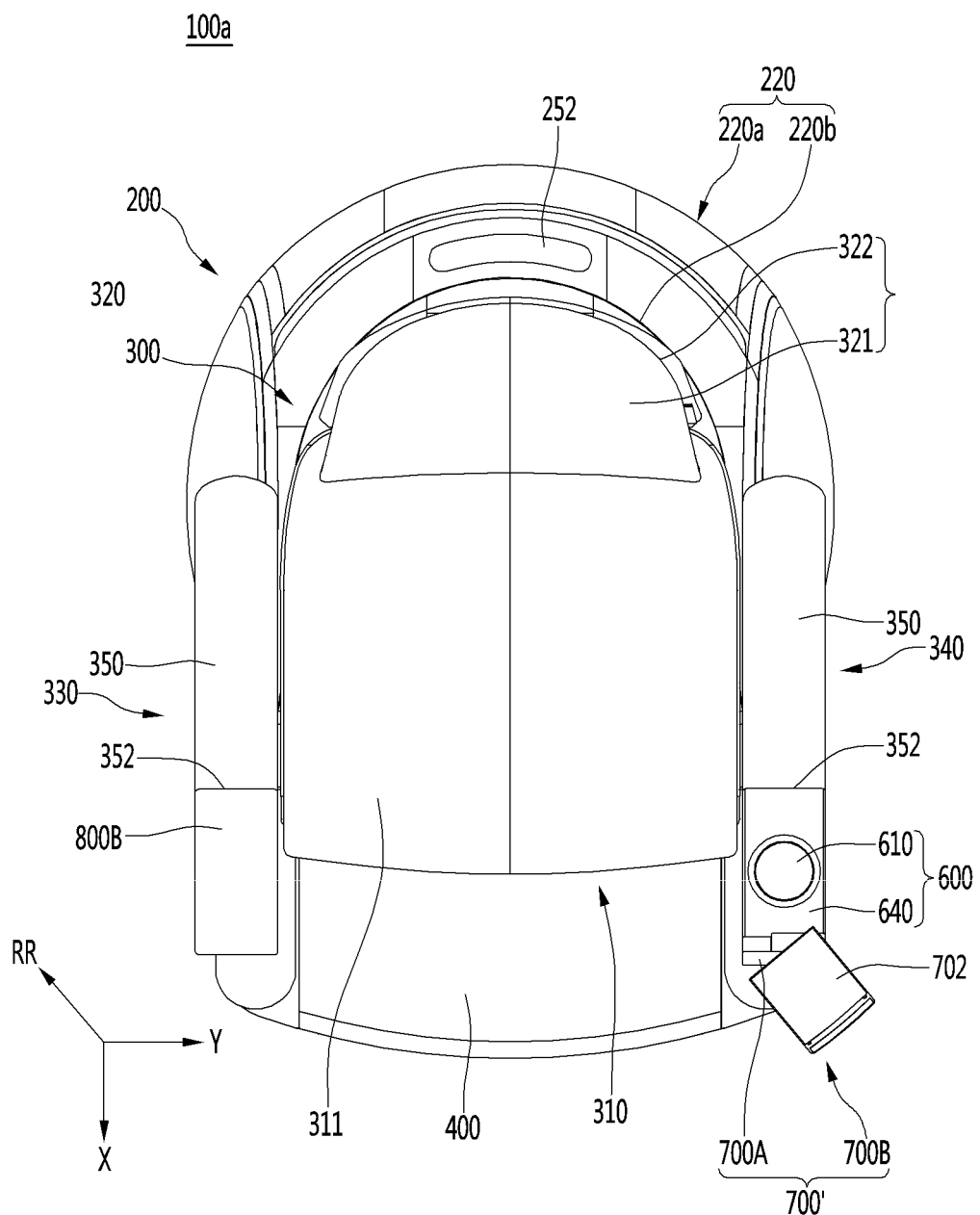
FIG. 30 is a plan view when another display is disposed at a left side of a seating body according to an embodiment.
Figure 31:
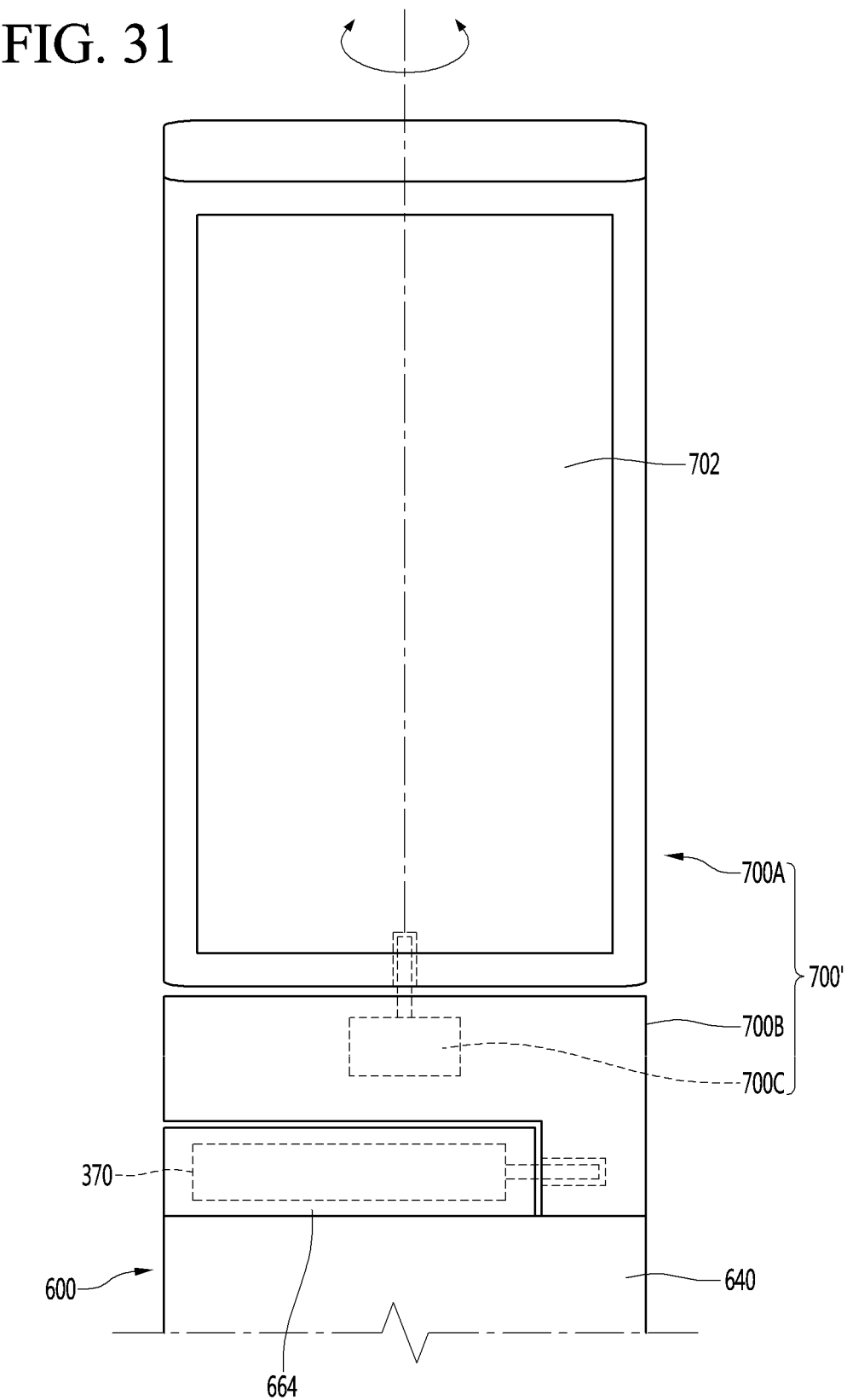
FIG. 31 is a plan view illustrating another example of the display according to an embodiment.

FIG. 29 is a plan view when another display is disposed at a right side of a seating body according to an embodiment, FIG. 30 is a plan view when another display is disposed at a left side of a seating body according to an embodiment, and FIG. 31 is a plan view illustrating another example of the display according to an embodiment.

A screen of a display 700' may rotate at a predetermined angle toward the seat body 310. The display 700' may be disposed on a rear surface 702 with respect to the standing of the display 700'. As illustrated in FIG. 29, when the display 700' is disposed at a right side of the seating body 300, the scree of the display 700' may rotate toward a left rear side. On the other hand, as illustrated in FIG. 30, when the display 700' is disposed at a left side of the seating body 300, the screen of the display 700' may rotate toward a right rear side.

The robot 700 may include a lower display 700A disposed in the steering housing 640 and an upper display 700B rotating in the left-right direction with respect to the lower display 700A and provided with a screen. One of the lower display 700A and the upper display 700B may be provided with a rotation shaft, and the other may be provided with a shaft support for rotatably supporting the rotation shaft. The upper display 700B may rotate about the rotation shaft.

The lower display 700A may be rotatably connected to the display connection portion 664 disposed on the steering 600, and the display motor 370 may allow the lower display 700A to rotate.

The robot may further include a rotation motor 700C for allowing the upper display 700B to rotate.

As illustrated in FIG. 29, when the steering wheel 600 is disposed on the armrest body 350 of the right armrest 330, the processor 180 may control the rotation motor 700C in a left rotation mode. As illustrated in FIG. 29, the rotation motor 700C may allow the upper display 700B to rotate so that a rear surface 702 of the upper display 700B faces a left rear side LR.

When the steering wheel 600 is disposed on the armrest body 350 of the left armrest 340, the processor 180 may control the rotation motor 700C in a right rotation mode. As illustrated in FIG. 31, the rotation motor 700C may allow the upper display 700B to rotate so that a rear surface 702 of the upper display 700B faces a right rear side RR.

In the display 700' illustrated in FIGS. 29 to 31, other configurations and functions other than the upper display 700B rotating in the left-right direction with respect to the lower display 700A may be the same as those of the display 700 illustrated in FIGS. 4 to 8, and thus, the detailed description is omitted to avoid duplicate description.

According to an embodiment, it may be possible to minimize the safety accidents that occurs when the accessory is installed, and to safely transport the user to the destination.

In addition, the overflow of the beverage in the cup holder may be minimized, and the robot may be maintained in the clean state.

In addition, it may be possible to minimize the overturning of the robot by the baggage.

In addition, since the robot is deformed in a form that the user is capable of easily boarding, even a person who is uncomfortable may quickly and safely board on the robot.

In addition, the damage or safety accident of the medical device that occurs when the robot is traveling may be minimized.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A robot, comprising:
    a main body including:
        a traveling wheel;
        a traveling motor configured to rotate the traveling wheel; and
        a first accessory mounting portion configured to receive one of a plurality of accessories;
    a seating body including:
        a seat body disposed above the main body; and
        a second accessory mounting portion configured to receive one of the plurality of accessories;
    a seat body actuator configured to move the seat body; and
    a processor configured to:
        control the traveling motor and the seat body actuator in a special mode based on a type of the accessory among the plurality of accessories mounted on the first accessory mounting portion or the second accessory mounting portion; and
        control the traveling motor and the seat body actuator in a normal mode when no accessory is mounted to either of the first accessory mounting portion or the second accessory mounting portion.

2. The robot according to claim 1, wherein the plurality of accessories include a cup holder separably mounted on the second accessory mounting portion.

3. The robot according to claim 2, wherein the processor is further configured to, when the cup holder is mounted on the second accessory mounting portion and the main body travels along a non-horizontal surface, control the seat body actuator to move the seat body to a horizontal position.

4. The robot according to claim 2, wherein the processor is further configured to, when the cup holder is mounted on the accessory mounting portion and the main body rotates or passes over a protrusion, control the traveling motor in the special mode to drive the traveling motor at a lower speed than a speed of the traveling motor in the normal mode.

5. The robot according to claim 1, wherein the plurality of accessories include a baggage supporter separably mounted on the first accessory mounting portion, the baggage supporter being configured to support baggage.

6. The robot according to claim 5, wherein the processor is further configured to, when the baggage supporter is mounted on the first accessory mounting portion and the main body rotates, passes over a protrusion, or travels along a slope, control the traveling motor in the special mode to drive the traveling motor at a lower speed than a speed of the traveling motor in the normal mode.

7. The robot according to claim 5, wherein the processor is further configured to, when the baggage supporter is mounted on the first accessory mounting portion and the main body travels along a slope that is inclined at a predetermined angle or more, control the traveling motor in the special mode to drive the traveling motor at a minimum speed while the main body travels along the slope.

8. The robot according to claim 5, wherein the processor is further configured to, when the baggage supporter is mounted on the first accessory mounting portion and the baggage is supported on the baggage supporter, control the traveling motor in the special mode to cause the robot to travel along a traveling path having no slope or having a minimum number of slopes among a plurality of traveling paths.

9. The robot according to claim 1, wherein the plurality of accessories include a medical device supporter supporting a medical device for assisting a user's walk, the medical device supporter being separably mounted on the first accessory mounting portion.

10. The robot according to claim 9, further comprising:
    a foot supporter disposed on a front lower portion of the main body; and
    a foot supporter actuator configured to adjust a height and an angle of the foot supporter,
    wherein the processor is further configured to, when the medical device supporter is mounted on the first accessory mounting portion, control the foot supporter actuator in the special mode to adjust the angle or height of the foot supporter.

11. The robot according to claim 9, further comprising:
an armrest body disposed on the seat body; and
an armrest body mover configured to move the armrest body to move forward and backward,
wherein the processor is further configured to, when the medical device supporter is mounted on the first accessory mounting portion, control the armrest body mover in a boarding mode to move the armrest body backward.

12. The robot according to claim 9, wherein the processor is further configured to, when the medical device supporter is mounted on the first accessory mounting portion, control the traveling motor to cause the robot to travel along a traveling path having a minimum ceiling height that exceeds a predetermined height among a plurality of traveling paths.

13. The robot according to claim 9, wherein the processor is configured to stop the robot when the medical device supporter is mounted on the first accessory mounting portion and each of a plurality of traveling paths have a minimum ceiling height equal to or less than a predetermined height.

14. The robot according to claim 1, wherein the plurality of accessories include a medicine supporter separably mounted on the first accessory mounting portion and supporting a medicine.

15. The robot according to claim 14, wherein the processor is further configured to, when the medicine supporter is mounted on the first accessory mounting portion, control the traveling motor in the special mode to drive the traveling motor at a lower speed than a speed of the traveling motor in the normal mode while the main body rotates, passes over a protrusion, or travels along a slope.

16. The robot according to claim 14, wherein the processor is further configured to, when the medicine supporter is mounted on the first accessory mounting portion and the main body travels along a slope that is inclined at a set angle or more, control the traveling motor in the special mode to drive the traveling motor at a minimum speed while the robot travels along the slope.

17. The robot according to claim 14, wherein the processor is configured to, when the medicine supporter is mounted on the first accessory mounting portion, control the traveling motor in the special mode to move the robot along a traveling path having no slope or a having minimum number of slopes among a plurality of traveling paths.

18. The robot according to claim 1, wherein the seating body includes:
a left armrest body;
a right armrest body spaced apart from the left armrest body in a left-right direction; and
a steering disposed on one of the left armrest body and the right armrest body,
wherein the steering comprises:
a steering housing;
a display configured to be rotated; and
a steering body disposed in the steering housing.

19. The robot according to claim 1, wherein, the processor is further configured to, in a shopping mode:
drive the traveling motor at a lower speed than a speed of the traveling motor in the normal mode; and
control the seat body actuator to increase a height of the seat body.

20. The robot according to claim 1, wherein the seat body actuator includes a plurality of actuators spaced apart from each other in a front-rear direction and in a left-right direction, the left-right direction being perpendicular to the front-rear direction, and
wherein each of the plurality of actuators is configured to be independently driven to maintain a horizontal position of the seat body in the normal mode.

* * * * *